United States Patent [19]

Elander et al.

[11] Patent Number: 4,500,750
[45] Date of Patent: Feb. 19, 1985

[54] CRYPTOGRAPHIC APPLICATION FOR INTERBANK VERIFICATION

[75] Inventors: Robert C. Elander; Richard E. Lennon, both of Saugerties; Stephen M. Matyas; Carl H. W. Meyer, both of Kingston; Robert E. Shuck, West Hurley, all of N.Y.; Walter L. Tuchman, Boulder, Colo.

[73] Assignee: International Business Machines Corporation, Armonk, N.Y.

[21] Appl. No.: 335,974

[22] Filed: Dec. 30, 1981

[51] Int. Cl.³ .............................................. H04L 9/02
[52] U.S. Cl. ............................. 178/22.08; 178/22.09; 178/22.14
[58] Field of Search ............... 178/22.08, 22.09, 22.14; 340/825.34

[56] References Cited

U.S. PATENT DOCUMENTS

| | | | |
|---|---|---|---|
| 3,956,615 | 5/1976 | Anderson et al. | 178/22.08 |
| 4,259,720 | 3/1981 | Campbell | 178/22.08 |
| 4,317,957 | 3/1982 | Sendrow | 178/22.08 |
| 4,386,233 | 5/1983 | Smid et al. | 178/22.14 |
| 4,408,203 | 10/1983 | Campbell | 178/22.08 |
| 4,423,287 | 12/1983 | Zeidler | 178/22.08 |

Primary Examiner—Sal Cangialosi
Attorney, Agent, or Firm—Edwin Lester

[57] ABSTRACT

In a data communication network which includes terminals interconnected via a central switch, a process for verifying the identity of a terminal user who is provided with secret data associated with his identity. In carrying out the verification process, the secret data is first encrypted at the terminal under a transfer-in key for transmission to an associated data processing system. When it is determined that the terminal user maintains an account at the associated data processing system, a first translate operation is performed to translate the data from encryption under the transfer-in key to encryption under an authentication key, both of which keys are protected under other keys which are different from each other, thereby providing an authentication parameter which may be used to verify the identity of the terminal user. When it is determined that the terminal user does not maintain an account at the associated data processing system, a second translate operation is performed to translate the data from encryption under the transfer-in key to encryption under a transfer-out key for transmission to the next associated host system, the switch or a remote host system. At each such node, except the switch, a determination is made as to whether a verification process can be performed otherwise, the encrypted data is translated for transmission to the next or a remote node of the network for such verification.

25 Claims, 29 Drawing Figures

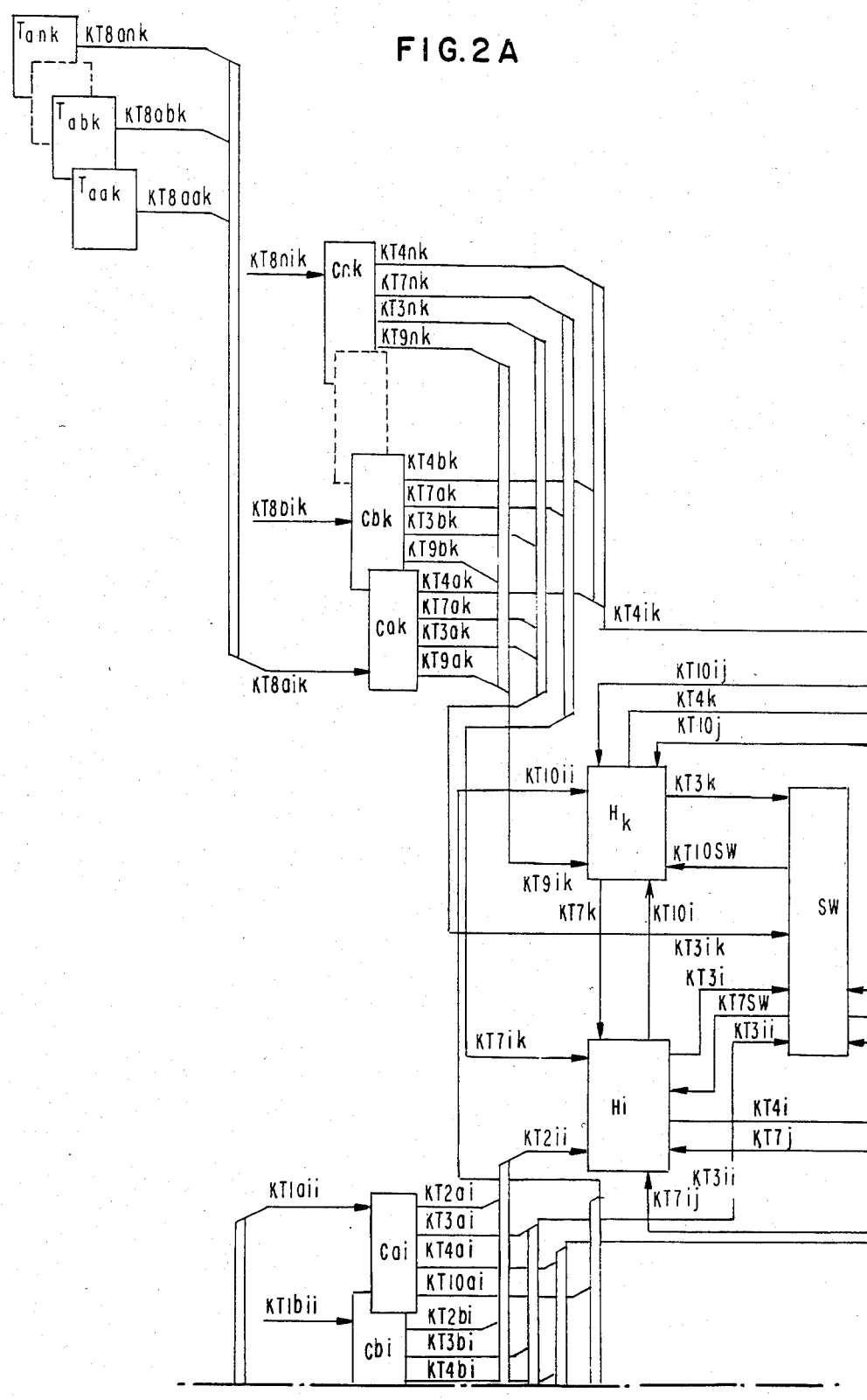

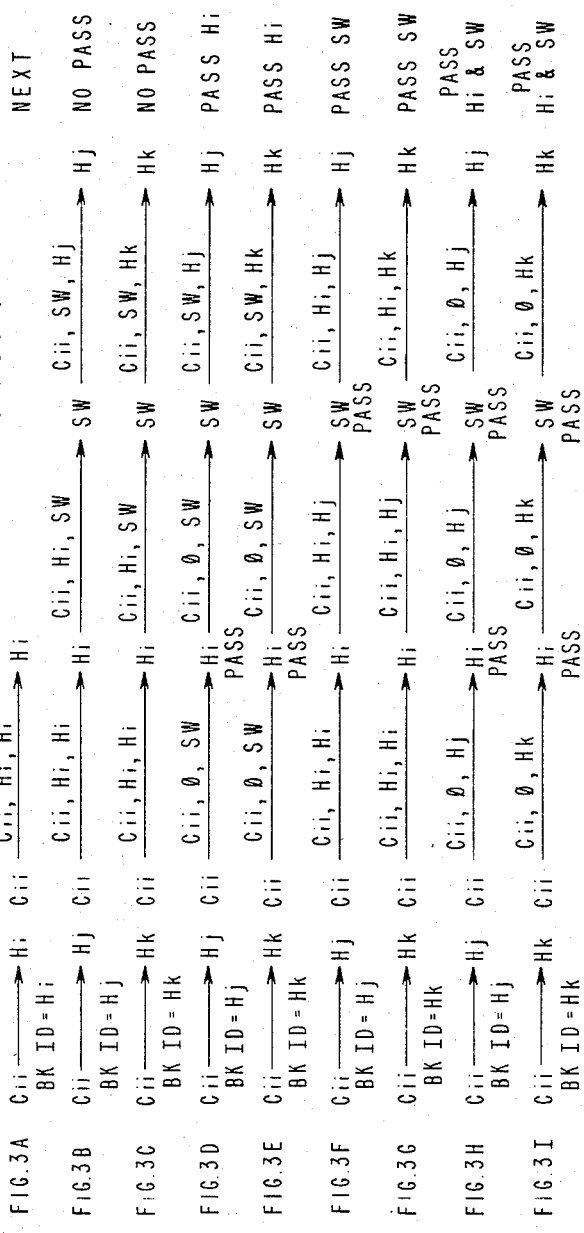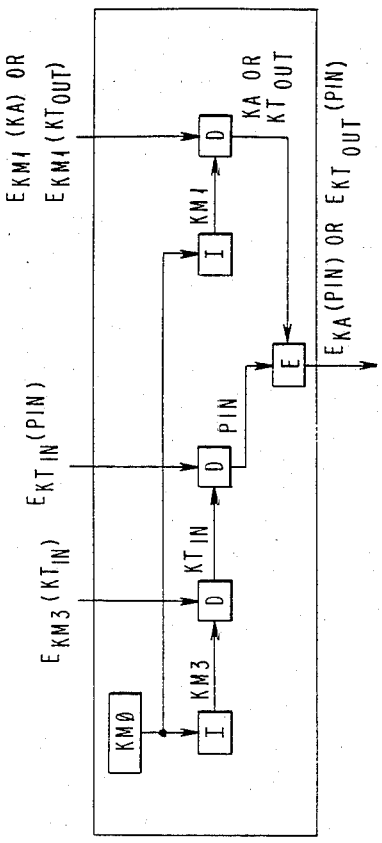

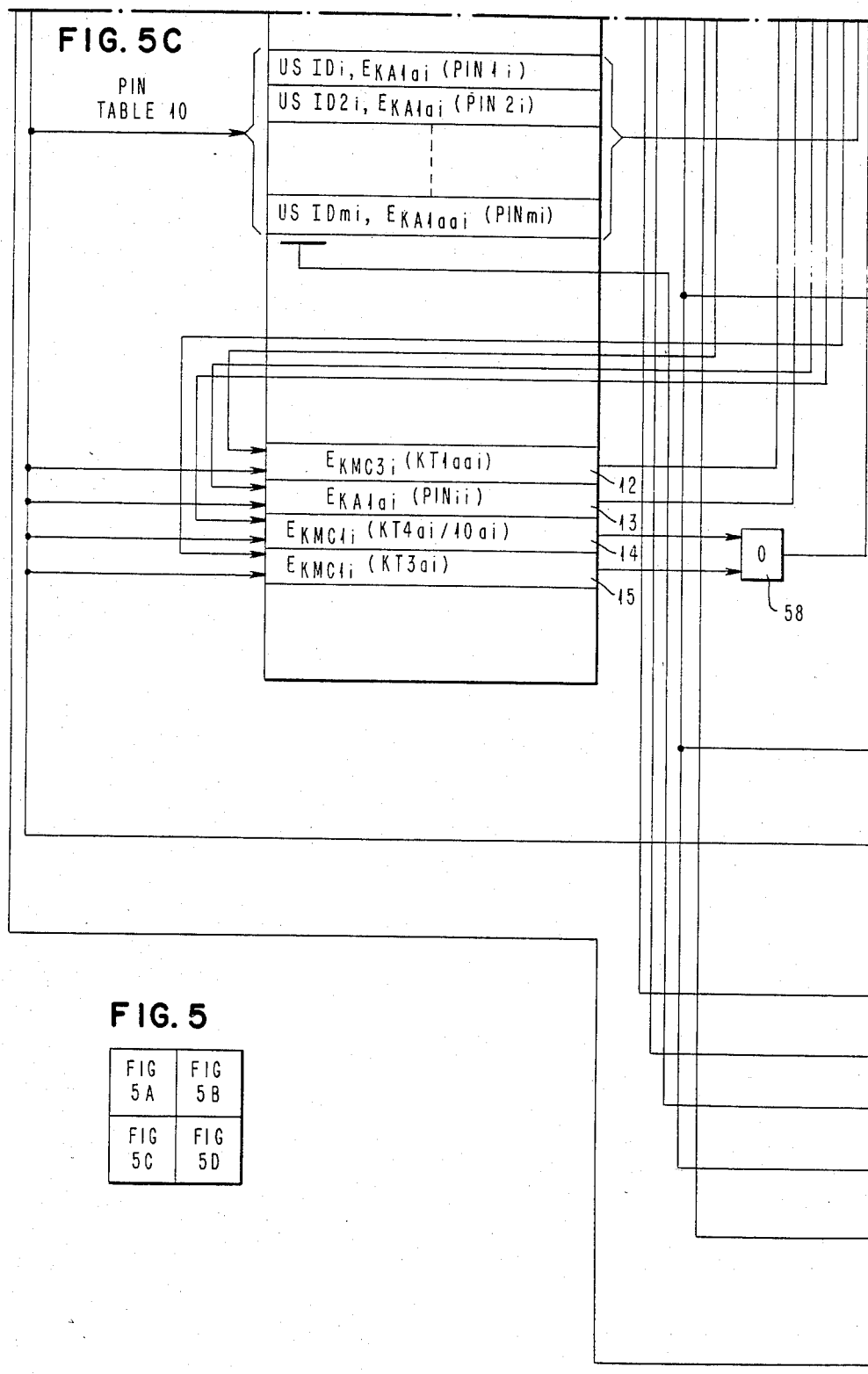

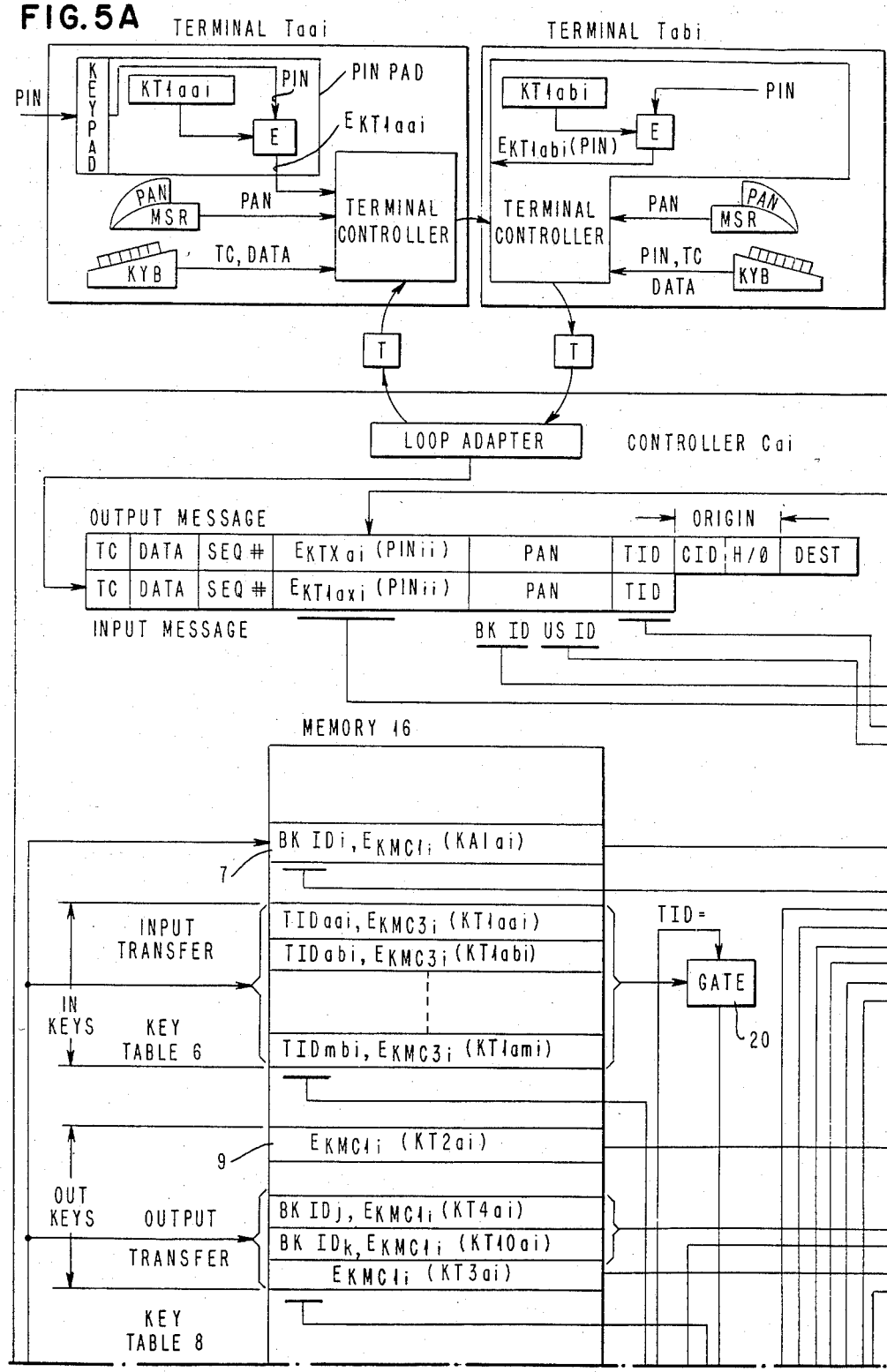

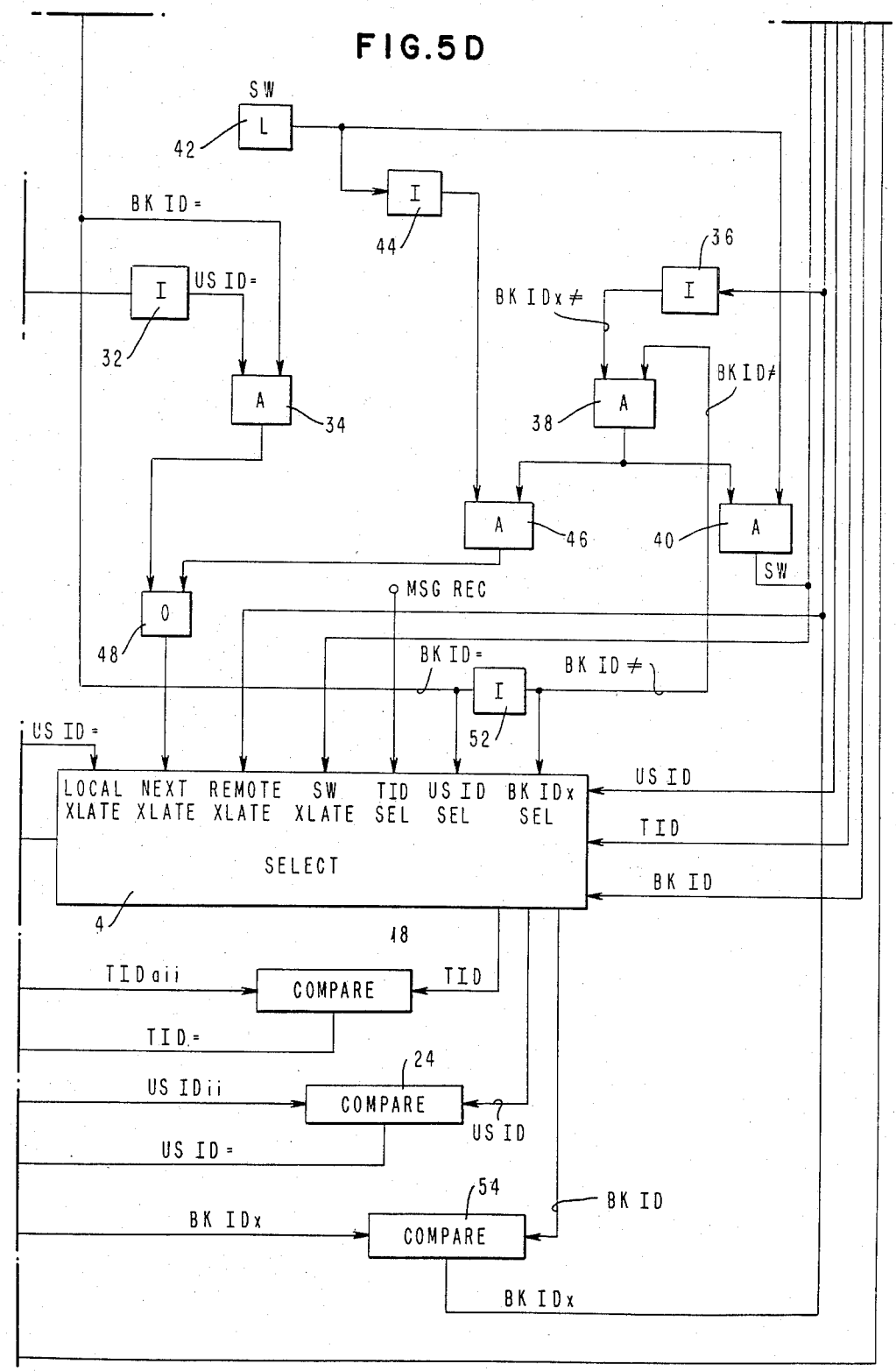

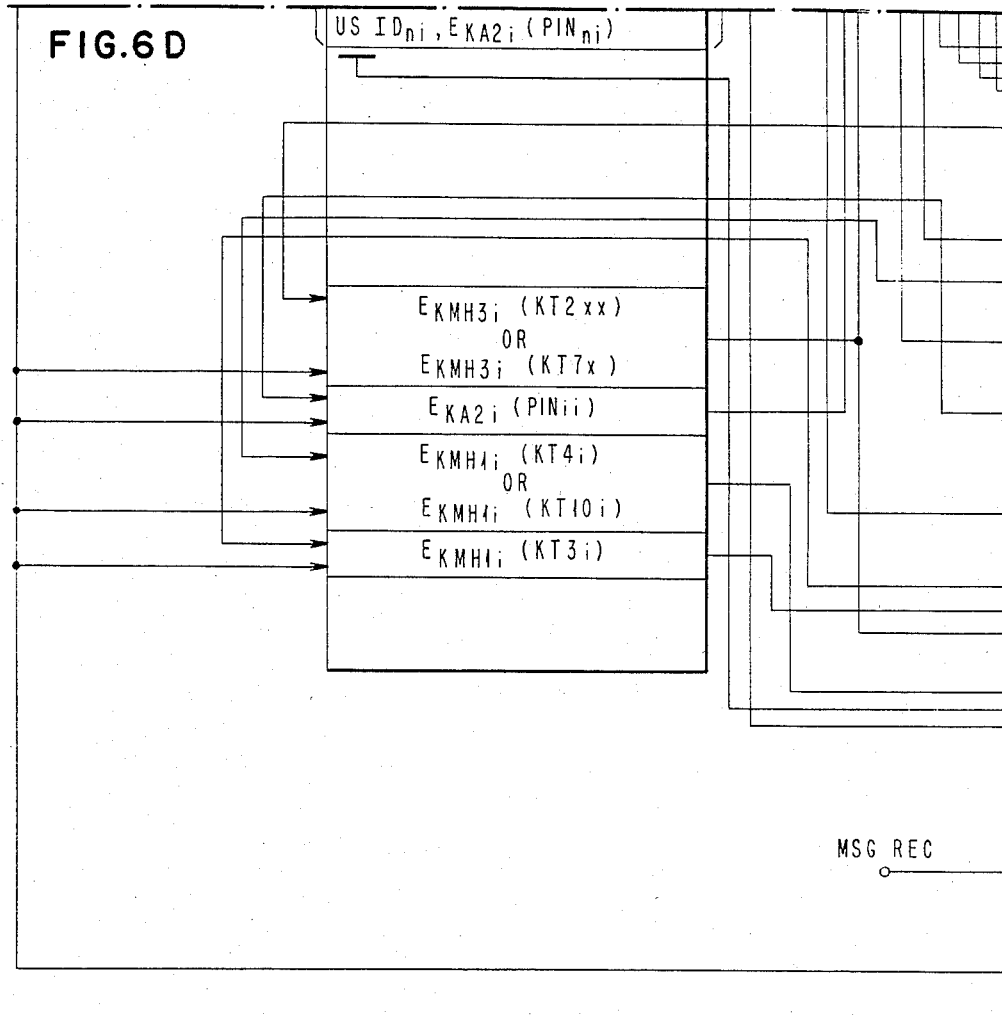

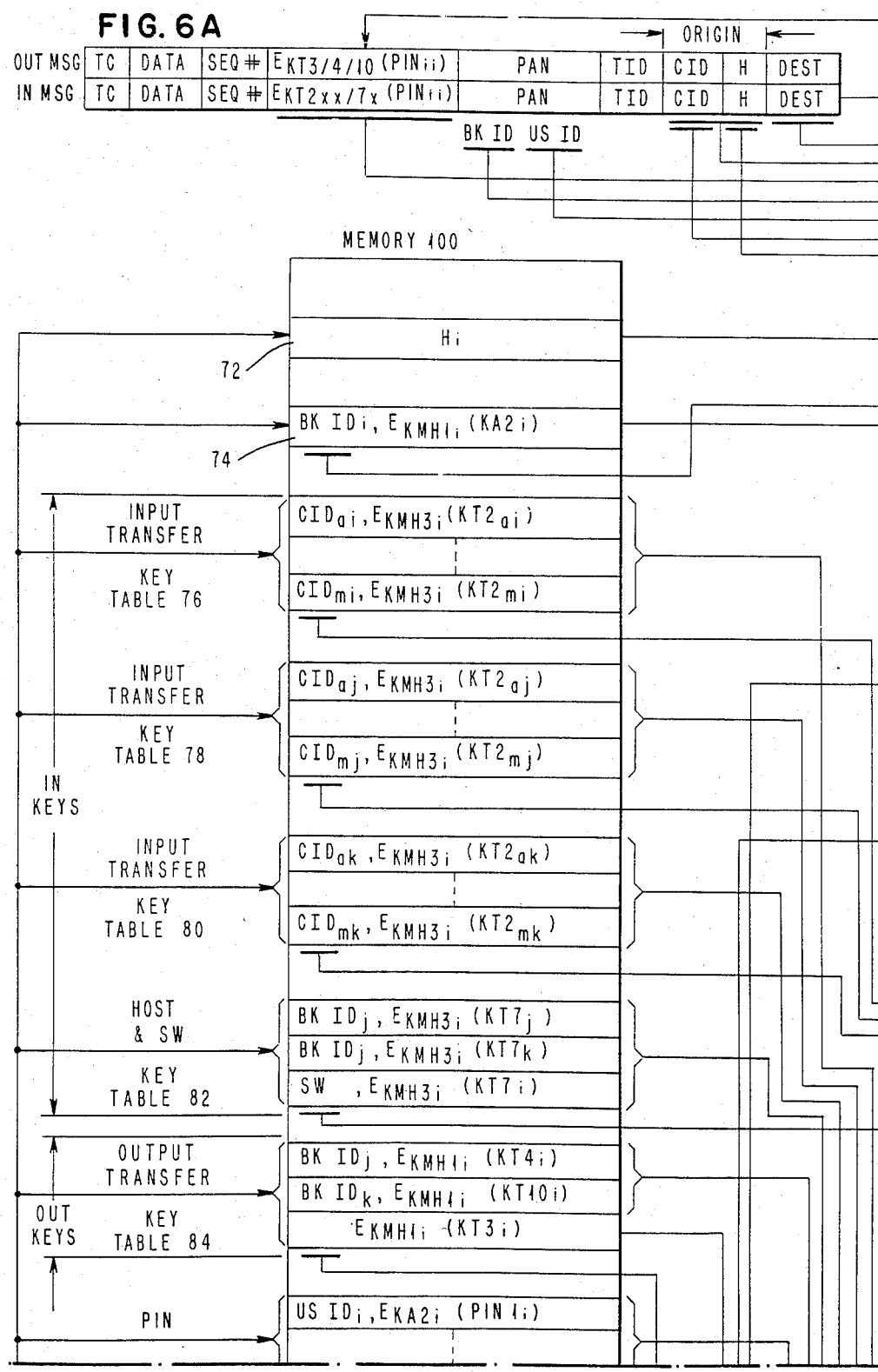

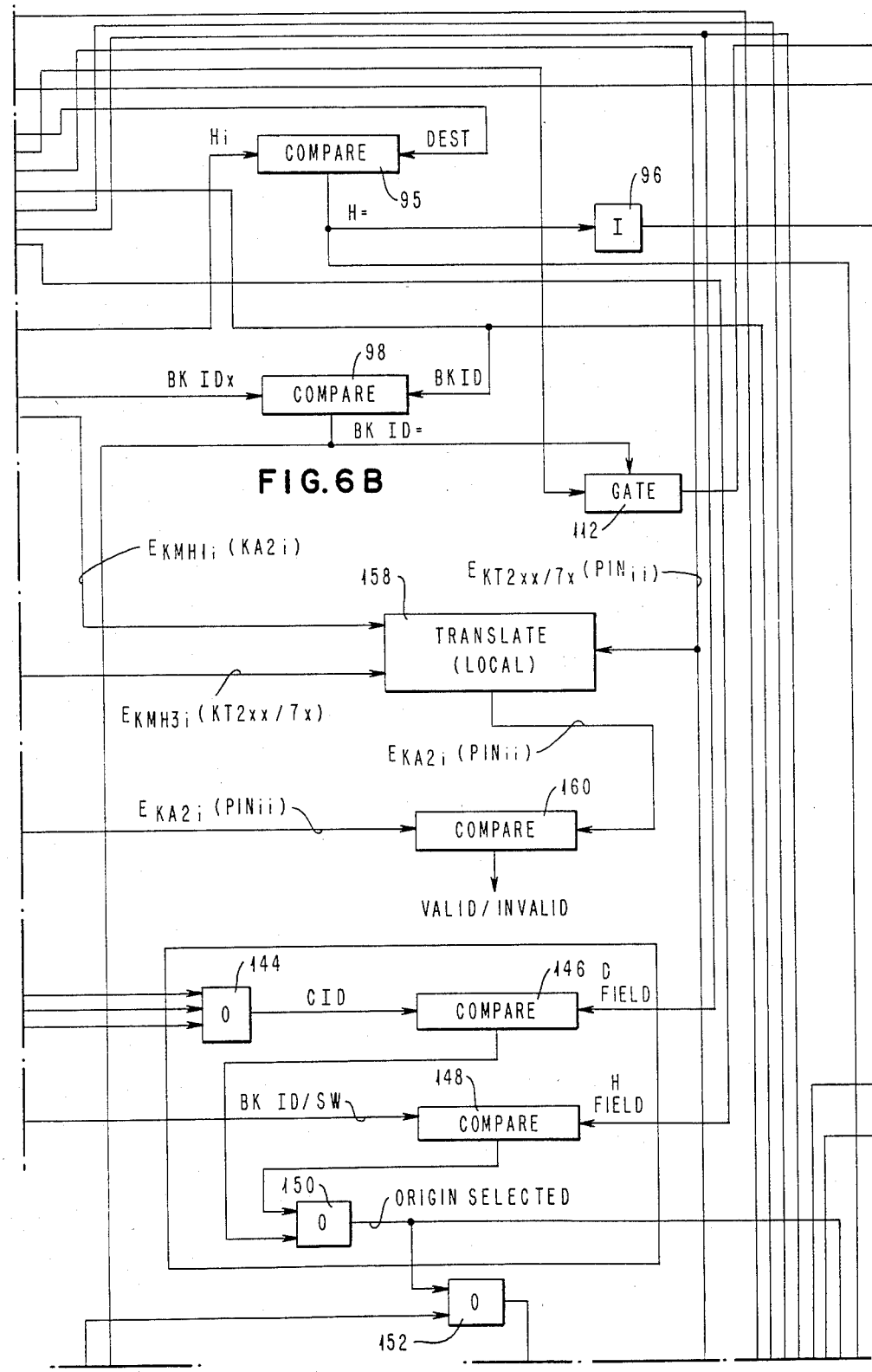

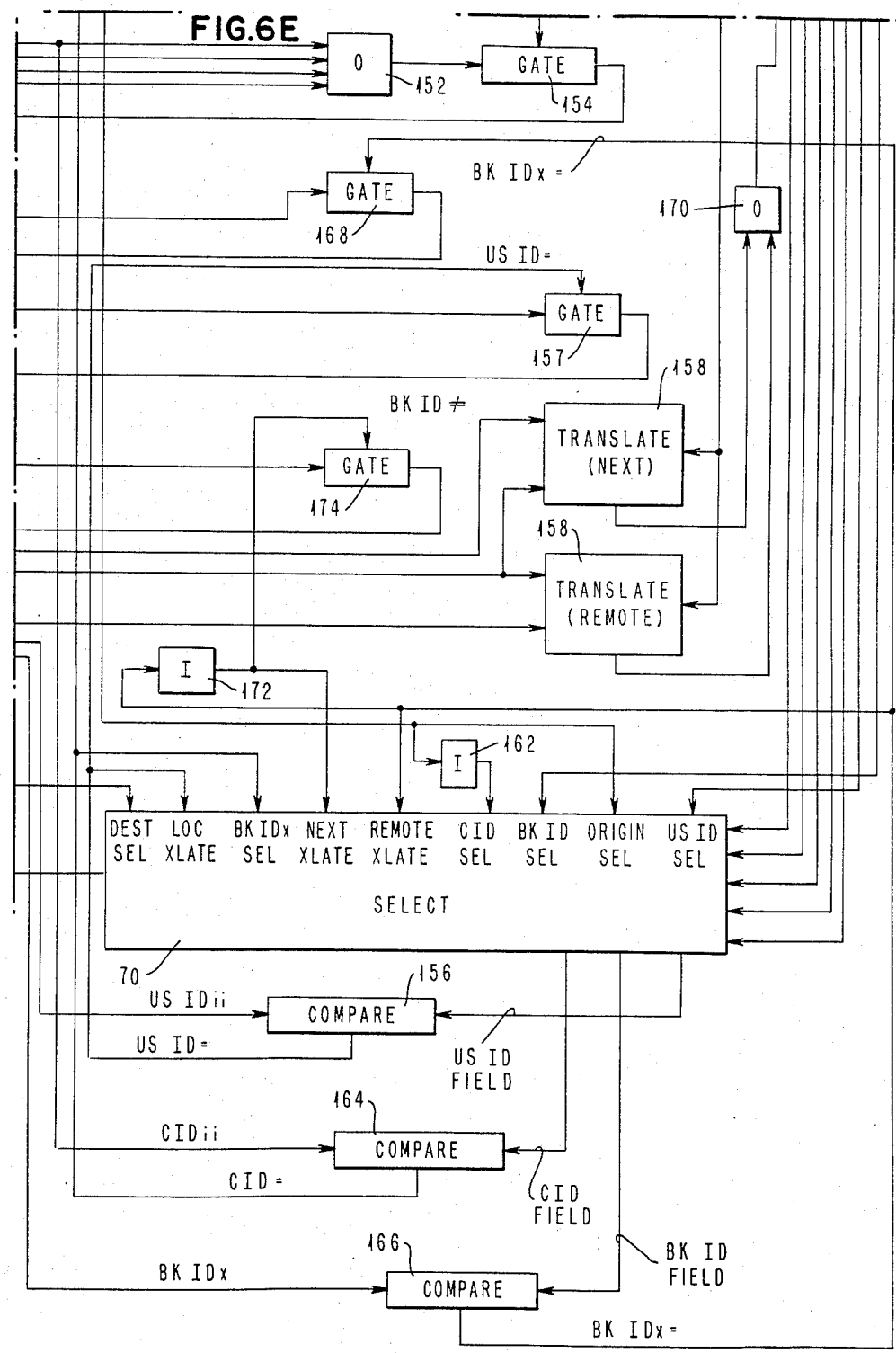

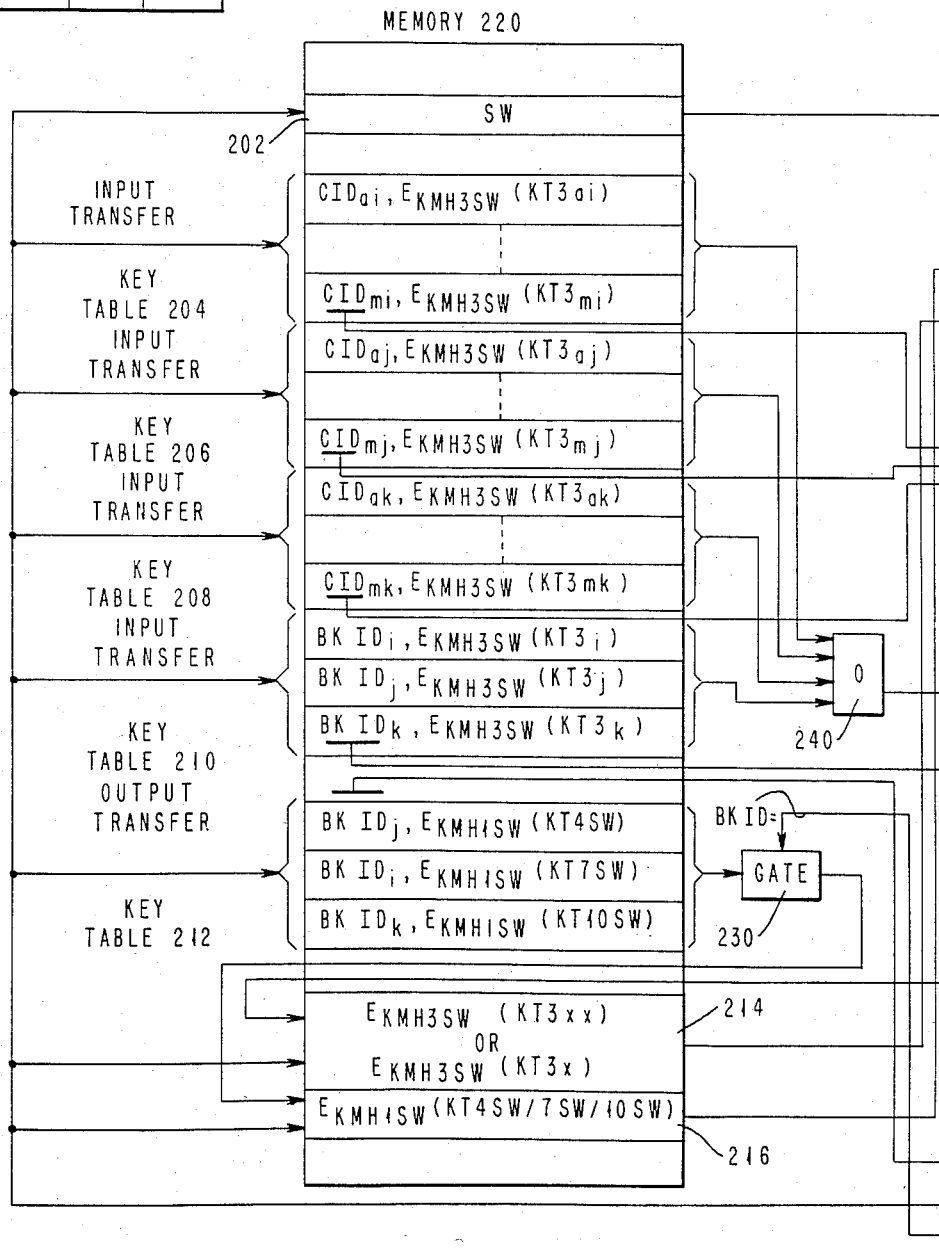

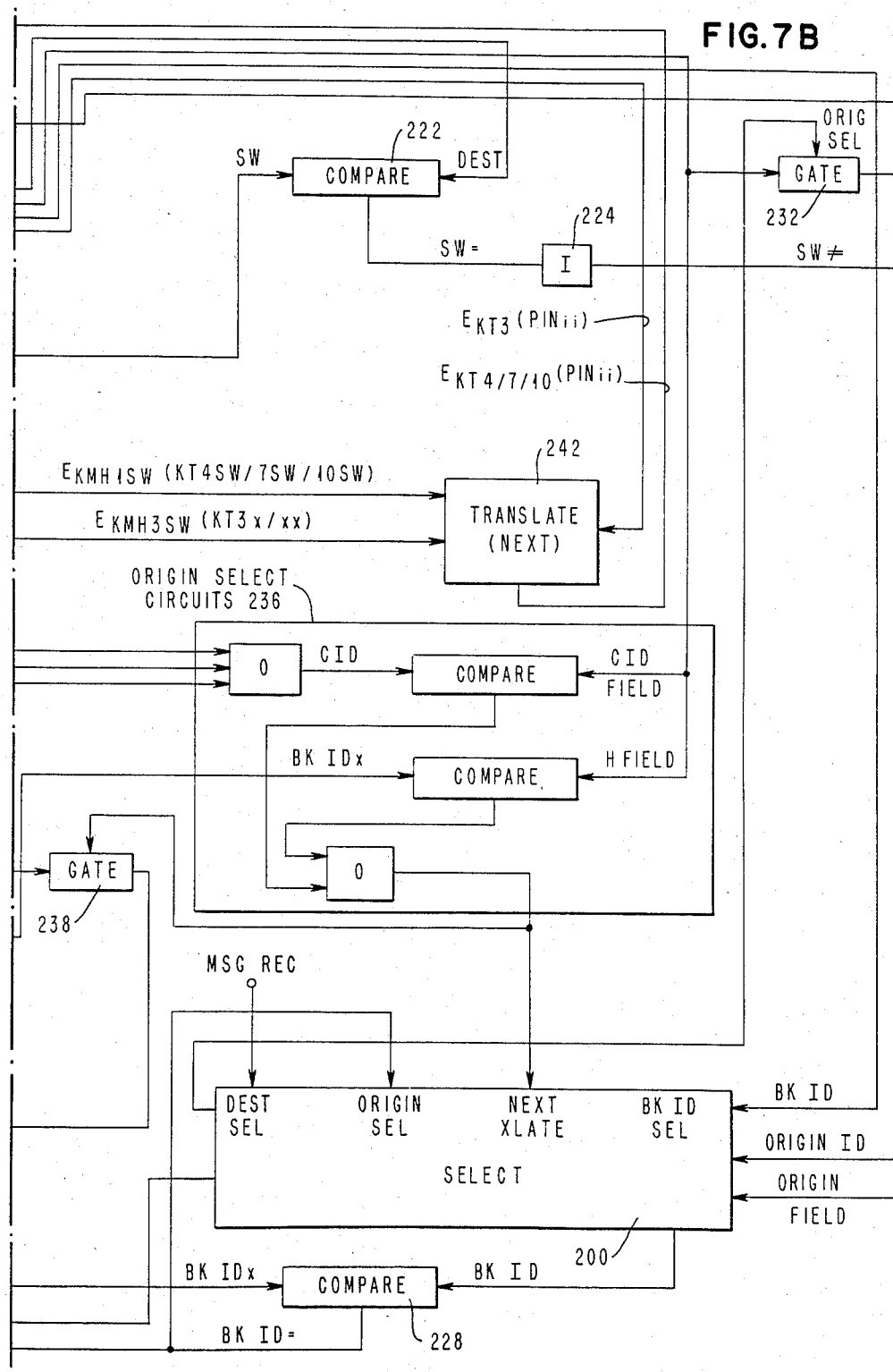

CRYPTOGRAPHIC APPLICATION FOR INTERBANK VERIFICATION

BACKGROUND OF THE INVENTION

This invention relates to data security techniques and, more particularly, to a process for verifying the identity of a terminal user.

Data security is concerned with the prevention of unauthorized entry, modification and disclosure of sensitive data. Electronic Funds Transfer (EFT) systems electronically transfer billions of dollars between institutions and individuals. Deposit and withdrawal transactions cannot be processed safely unless user identities can be validated securely. The process of validating user identities is called personal verification. A user is normally provided with an embossed, magnetic stripe identification card (bank card) containing a primary account number (PAN) a portion of which may include the bank identification number and the user account number, and the card's expiration date. The bank at which the customer opens his account, and which provides the user with a bank card, is called the issuer. At an entry point to the system, information on the user's bank card is read into the system and the user enters a secret quantity called the personal identification number (PIN). If the card holder has supplied the correct PIN associated with the PAN obtained from the card, and if the balance in the account is sufficient to permit the transaction, and if that type of transaction is allowed for that account, the system authorizes the transaction.

The bank which first acts on information entered at an EFT terminal is called the acquirer. A user who initiates a transaction at an EFT terminal may be a customor of the local bank, in which case, the acquirer is also the issuer. If a user can initiate transactions at an entry point not controlled by the issuer, the supporting network is called an interchange. The interchange allows member banks to connect to what may be termed a central master bank called a switch such that requests for information or transactions which cannot be handled by one member bank may be routed to another member bank, with the other member bank being the owner of the information requested. Each member bank need not be aware of the other member banks, just the switch. Of necessity, therefore, before a transaction can be completed, the requester must be verified as a valid customer. Thus, the problem of security in a single banking system becomes far more complex when a network of banks are arranged in an interchange.

Verification is a process which serves to prove that a user of the system is the person authorized to obtain access to the system and the resources therein. This requires a special test of legitimacy, an early form of which arose with the advent of identification cards bearing an identification number (ID) of the person being identified for access to the system. The card would be read at an entry point of the system and compared with a table of ID values to validate the potential user of the system. However, this test had limited value in view of the fact that the card could be easily lost or copied. Accordingly, to provide more secure verification, it became necessary to provide additional evidence that the person presenting an ID card is the correct owner of the card. This was accomplished by providing the authorized user with a memorized PIN for entry into the system along with the user ID. A table of valid reference PINs is stored at the host data processing system (Bank) and is accessible by the user ID. In this arrangement, the ID card is read at the terminal and the memorized PIN is manually entered at the keyboard of the terminal or some other suitable entry device such as a pin pad, the combination being transmitted to the host system. At the host system, the PIN of reference is accessed from the table, on the basis of the user ID, and compared with the received PIN from the terminal to verify the user of the system. Another form of PIN verification is available when the terminals and data processing nodes each have cryptographic facilities. Thus, in such a system, the reference table of clear PINs may be replaced by a reference table of authentication parameters each of which is a cryptographic function of the PIN so that the PINs need never be stored in clear form. In this arrangement, the user ID and PIN are entered at a terminal and the PIN is encrypted to provide an authentication parameter using a cryptographic function. The user ID and authentication parameter are then transferred to the data processing node where the authentication parameter of reference is accessed from the reference table on the basis of the user ID and compared with the received authentication parameter to verify the user of the system.

In a single banking system, the verification is done at the local bank thereby reducing the security exposure of the PINs. However, in a large bank which has many branch offices, each of which may retain the accounts only for the depositers in their branch, with the total depositer table being retained at the main office. In such a case, verification at a branch may not be feasible if the customer is a depositer associated with a different branch of the bank, in which case, the PIN information has to be transferred from the terminal of the branch to the main office for verification before proceeding with the transaction. In such an arrangement, if it is determined that the message from the terminal corresponds to an account maintained at the associated branch, the branch data processor will compare the authentication parameter of reference with the received authentication parameter to verify the identity of the terminal user. However, if the transaction message corresponds to an account maintained at a different branch of the bank, then the encrypted PIN can be re-encrypted into a new authentication parameter which can be transmitted to the main office for verification. At the main office, the authentication parameter of reference, from the table maintained at the main office, is compared with the new authentication parameter received from the branch to verify the identity of the terminal user. It should be apparent that as banks are combined into an interchange which permits a customer of one bank to use the facilities of another bank, the entered PIN at a terminal can be routed through the network to the issuer bank before verification can be obtained. Because of this complexity, it becomes increasingly important to provide a process for validating a terminal user with a minimum of security exposure. In one prior art arrangement, all of the PINs associated with one node as well as the transfer keys from nodes connected to the one node and the transfer keys from the one node to other nodes are all enciphered under the system master key of that node. This permits the same transfer key to be used as both a transfer-in key and a transfer-out key, Which, for all practical purposes means that the properties of "transfer-in" and "transfer-out" cannot be enforced. As a consequence, a cryptographic attack, in which PINS are intentionally misrouted to a compromised node, may succeed by intercepting a PIN encrypted under a transfer-out key on the outbound communication line from the node. Then, gaining access to the sending node, another translation operation can then be performed in accordance with the previous transfer-out key of the sending node used as the transfer-in key and the transfer-out key of the compromised node used as the present transfer-out key, to translate the PIN from encryption under the previous transfer-out key to encryption under the present transfer-out key of the compromised node where, after being transmitted to the compromised node, it be possible to obtain the PIN in clear form.

Accordingly, it is the object of the invention to provide a secure process of verifying the identity of a terminal user.

Another object of the invention is to translate information from encryption under one transfer key to encryption under another transfer key, where the keys may not be selectively used interchangeably.

A further object of the invention is to translate data from encryption under one transfer key to encryption under another transfer key, where the keys are provided under the protection of other keys which are different than one another.

Still another object of the invention is to translate key information from encryption under a transfer-in key to encryption under a transfer-out key, where the transfer keys are provided under the protection of other keys which are different than one another.

Still a further object of the invention is to translate a user's personal identification number encrypted under a transfer key to encryption under an authentication key for user verification, where the keys are provided under the protection of other keys which are different than one another.

Still another object of the invention is to translate, at one data processing node, a user's personal identification number encrypted under a transfer-in key from another node to encryption under a transfer-out key to the next connected node, where the transfer keys are provided under the protection of other keys which are different than one another.

Still a further object of the invention is to translate, at one data processing node, a user's personal identification number encrypted under a transfer-in key from another node to encryption under a transfer-out key associated with a remote data processing node.

Still another object of the invention is to protect user personal identification numbers at each processing node under a unique authentication key associated with that node.

Still a further object of the invention is to protect transfer-in keys stored at a processing node under a key which is different than the node master key.

Still another object of the invention is to protect transfer-out keys stored at a processing node under a key which is different than the node master key.

SUMMARY OF THE INVENTION

In accordance with the invention, a data communication network is provided which includes a plurality of host data processing systems interconnected via a central system or switch. Each host system includes one or more communication controllers, each having a data processing capability, establishing communication paths between transaction terminals and their associated host system. Each terminal and data processing node of the network is provided with cryptographic apparatus to permit encrypting and decrypting operations to be performed. Additionally, each data processing node is provided with a first system master key. In order to verify the identity of a terminal user, the user is provided with both a user card, which contains a PAN comprising a system identification number and an account or user identification number, and a secret personal identification number (PIN). Prior to carrying out the verification process, each host system performs an initialization process during which user cards and user PIN's are generated and assigned to each customer of the associated system. Also, authentication keys are generated and assigned to each data processing node of the associated system. Each PIN is enciphered under a node authentication key, with the result representing an authentication parameter corresponding to a user ID being stored at the node for use during the user verification process. The assigned authentication key is also enciphered under a second system master key, which may be a variant of the first system master key, to provide improved security for the stored authentication keys. Each host system also generates and distributes a plurality of transfer keys which are used to encipher PIN data at the terminal and each node for transfer to the next adjacent data processing node. At each data processing node, the transfer-in key from the next preceeding node or nodes is enciphered under a third system master key, which may be another variant of the node system master key, and the transfer-out key to the next succeeding node is enciphered under the second system master key for security protection, with such enciphered transfer keys being stored at each data processing node. Where previous arrangements are provided between the host system and the switch, each data processing node may also be provided with sets of transfer keys for a remote data processing node or nodes. Likewise, for security protection, these sets of transfer keys are also stored at each data processing node in encrypted form by encrypting those of these sets of transfer keys which are transfer-in keys under the third system master key of the associated node and those of these sets of transfer keys which are transfer-out keys under the second system master key of the associated node.

In carrying out the verification process, the user PIN is encrypted under a first transfer key at the terminal to provide a first encrypted PIN. A message including at least the encrypted PIN is transmitted from the terminal to the next data processing node. When it is determined that the terminal user is associated with the data processing node a first operation is performed at the data processing node in accordance with the encrypted first transfer key, which at the data processing node is considered a transfer-in key, and the encrypted first authentication key stored at the data processing node to translate the PIN encrypted under the transfer-in key to encryption under the first authentication key, with the re-encrypted PIN representing a first authentication parameter. The first authentication parameter is then compared with an authentication parameter of reference stored at the data processing node during the initialization process to provide an indication representing a verification of the identity of the terminal user.

When it is determined that the terminal user is not associated with the data processing node, a second operation is performed at the data processing node in accordance with the encrypted transfer-in key and an encrypted transfer-out key to translate the PIN encrypted under the transfer-in key to encryption under the transfer-out key, with the re-encrypted PIN representing a second encrypted PIN. Since verification cannot be accomplished at this node, a message including at least the second encrypted PIN is then transmitted from the data processing node to another one of the plurality of data processing nodes in the network to determine whether the identity of the terminal user can be verified at the other one of the plurality of data processing nodes.

The foregoing and other objects, features and advantages of the invention will be apparent from the following particular description of the preferred embodiment of the invention, as illustrated in the accompanying drawings.

BRIEF DESCRIPTION OF THE DRAWING

FIGS. 2A to 2C, taken together, comprise a block diagram of a representative system illustrating the arrangement of transfer keys in the interchange.

FIGS. 3A to 3I shows a series of diagrams illustrating the formatting and reformatting of origin and destination fields of a message passing through an interchange.

FIG. 4 illustrates, in block diagram form, a translate function operation.

FIG. 5 is a diagram of how FIGS. 5A to 5D, may be placed to form a detailed schematic diagram.

FIGS. 5A to 5D, taken together comprise a detailed schematic diagram of an embodiment of a communication controller together with a memory arrangement for carrying out various translate operations permitting verification of the identity of a terminal user or translation of user secret information for transfer to and verification at the next data processing node or at a remote data processing node.

FIGS. 6A to 6E, taken together comprise a detailed schematic diagram of a host system together with a memory arrangement for carrying out various translate operations permitting verification of the identity of a terminal user or translation of user secret information for transfer to and verification at the next data processing node or at a remote data processing node.

FIG. 7 is a diagram of how FIGS. 7A, may be placed to form a detailed schematic diagram.

FIGS. 7A to 7C taken together comprise a detailed schematic diagram of a switch and a memory arrangement for carrying out a translate operation for translation of user secret information for transfer to and verification at the next data processing node.

DETAILED DESCRIPTION OF THE INVENTION

Figure 1:
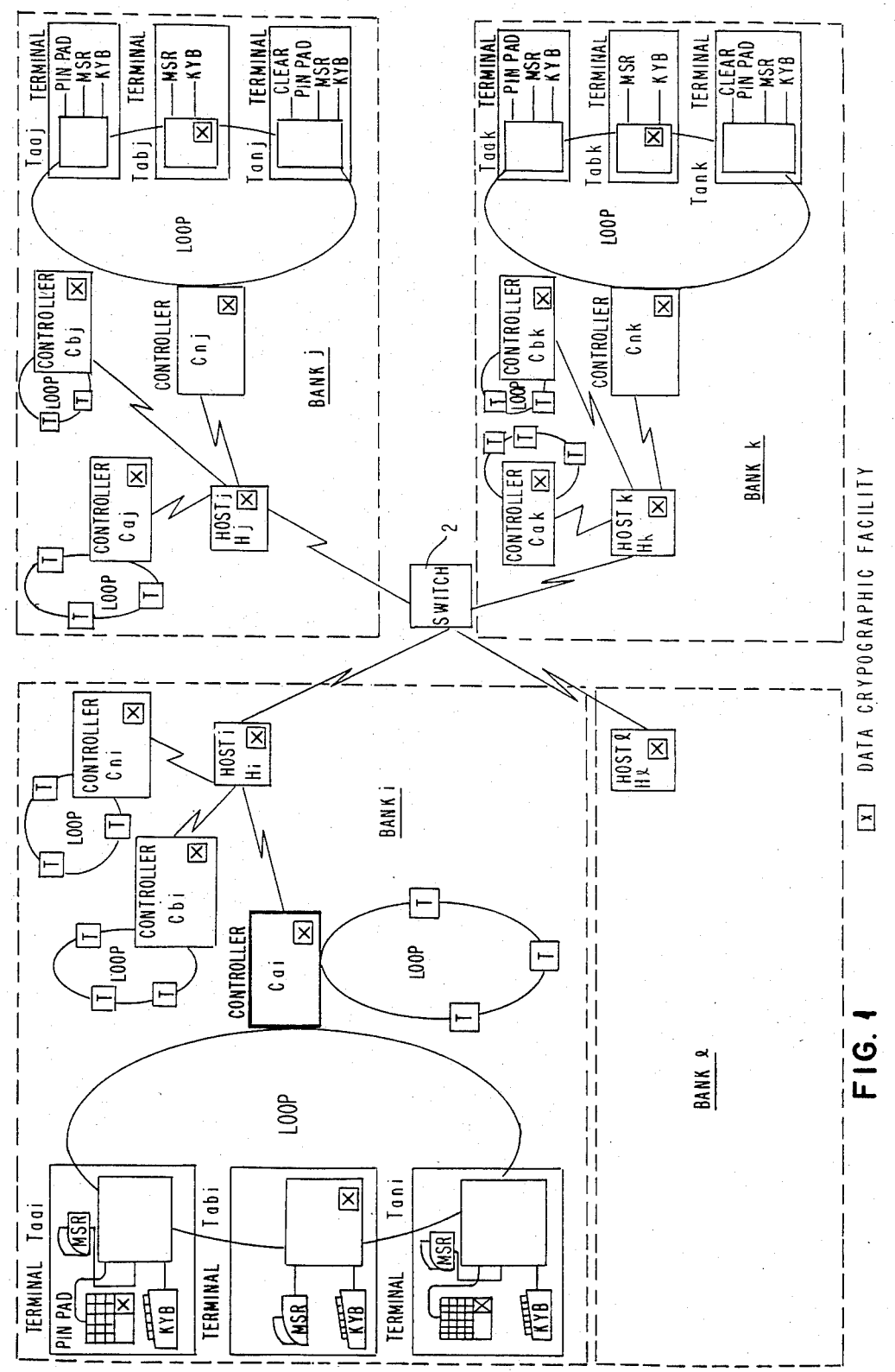
FIG. 1 is a block diagram illustrating a multi-host interchange.

Referring to FIG. 1 there is illustrated a representative interchange which includes a network of banks, i.e., $Bank_i$, $Bank_j$, $Bank_k$ and $Bank_l$ connected to a central master bank or switch 2. Each of the banks includes a host system, e.g., $Host_i$, which may comprise a data processing system and one or more communication controllers, e.g., the controllers $C_{ai}$, $C_{bi}$ through $C_{ni}$ each having a data processing facility and representing a branch of $Bank_i$, the controllers being connected via communication lines to the associated host system. Transaction terminals are generally connected to the communication controllers via a communication loop and include a keyboard at which a terminal user may enter a transaction code and transaction data. The transaction terminal, e.g., terminal $T_{aai}$, may also include an encrypting Pin Pad that attaches to the terminal allowing the user's PIN to be encrypted at the point of entry into the system. Also attached to the terminal is a magnetic stripe card reader (MSR) for reading user cards allowing entry of the PAN (system ID and user ID). Another type of terminal, e.g., terminal $T_{abi}$, may include an integrated cryptographic facility in which case the PIN may be entered at the keyboard along with the transaction code and transaction data. The terminal, using its cryptographic facility, then encrypts the entered PIN for transmittal to the associated controller as part of the transaction message.

When the transaction message reaches the branch controller, e.g., controller $C_{ai}$, a determination is made as to whether the user is a customer of this bank, and if so, whether the user has an account at the branch managed by the branch controller. If the user is a member of this bank and has an account at this branch, then, by performing a local translate operation, the encrypted PIN may be decrypted from encryption under the terminal transfer key and be re-encrypted under the authentication key stored at the controller, the result representing an authentication parameter which may be compared with an authentication parameter of reference, stored at the controller for PIN verification. If the user is a member of this bank but is found not to have an account at this branch, then by performing a next translate operation, the encrypted PIN may be decrypted from encryption under the terminal transfer key and be re-encrypted under the transfer-out key stored at the controller for transmission to the next node, i.e., to host $H_i$, for verification. The transaction message is reformatted prior to transmission to replace the encrypted PIN with the newly encrypted PIN and to add an origin field identifying the originating controller and its associated host, i.e., $C_{ai}$ and $H_i$ and a destination field identifying the destination host system, e.g., $H_i$. If the user is found not to be a member of this bank, then a determination is made as to whether the controller has stored a transfer-out key to any of the other host systems of the network or to the switch. If such an entry is determined to exist, then, by performing a remote translate operation, the encrypted PIN may be decrypted from encryption under the terminal transfer key and be re-encrypted under the transfer out key of the remote host system or the switch, stored at the controller, for transmission to such remote system, i.e., to host $H_j$, host $H_k$, host $H_l$, for verification or to switch SW for further transmission. The transaction message is reformatted prior to transmission to replace the encrypted PIN with the newly encrypted PIN, to add a controller origin field identifying the originating controller, to add a zero value in the host origin field, to identify that this is a remote transmission, and to add a destination field identifying the remote host system or the switch, i.e. host $H_j$, host $H_k$, host $H_l$ or switch SW. On the other hand, if the user is found not to be a member of this bank and it is determined that the controller has not stored a transfer key to any of the other host systems of the network or to the switch SW, then, a next translate operation is performed as described before.

When the transaction message reaches the host system, e.g., host $H_i$, a destination select operation is performed to compare the destination field of the message with the node identification stored at the receiving node. If these fields do not compare, then the transaction message is simply passed onward to the next node without further processing. On the other hand, if a compare is found, a determination is made as to whether the user is a customer of this bank by comparing the bank ID received in the input message with the bank ID stored at the host system. If a compare is obtained, indicating that the user is a customer of this bank, an origin selection operation is performed, on the basis of the origin fields of the received transaction message, to determine whether the message is being received from one of the controllers associated with the host system, from one of the controllers associated with one of the other host systems, from one of the other host systems or from the switch SW. A local translate operation is then performed and the encrypted PIN is decrypted and then re-encrypted under the authentication key stored at the host system, the result representing an authentication parameter which may be compared with an authentication parameter of reference stored at the host for PIN verification. If a bank ID compare is not obtained, i.e., the user is not a member of this bank, then a determination is made as to whether the host has stored a transferout key to any of the other host systems of the network. If such an entry is determined to exist, then by performing a remote translate operation, the encrypted PIN may be decrypted and be re-encrypted under the transfer-out key stored at the host, for transmission to the remote system, e.g., from host $H_i$ to host $H_j$, host $H_k$ or host $H_l$, for verification. The transaction message is reformatted prior to transmission to replace the encrypted PIN with the newly encrypted PIN and to update the origin and destination fields. On the other hand, if the user is found not to be a member of this bank and it is determined that the host system has not stored a transfer-out key to any of the other host systems of the network, then, a next translate operation is performed in which the encrypted PIN is decrypted and then re-encrypted under the transfer-out key stored at the host, for transmission to the next node i.e. switch SW, for further transmission. Here again, the transaction message is reformatted prior to transmission to replace the encrypted PIN with the newly encrypted PIN and to update the origin and destination fields.

When the transaction message reaches the switch SW, a destination select operation is performed to compare the destination field of the message with the node identification stored at the receiving node. If these fields do not compare, then the transaction message is simply passed onward to the next node without further processing.

On the other hand, if a compare is found, a determination is made, on the basis of the origin fields, as to whether there is a transfer-in key table entry from one of the controllers or whether the transfer-in key is from one of the other host systems. If it is determined that there is an entry, then such entry is used for performing a next translate operation in which the encrypted PIN is decrypted and then re-encrypted under the transfer-out key, stored at the switch SW, for transmission to the host system designated by the BK ID portion of the PAN, for verification. The transaction message is reformatted prior to such transmission to replace the encrypted PIN with the newly encrypted PIN and to update the origin and destination fields of the message. In this manner, the PIN may be routed through the network and be re-encrypted at each node or passed to the next node until it reaches the proper node at which verification of the terminal user can be made.

While the description has so far described a network in which an encrypted PIN is routed from one node to other nodes of the network, the same arrangement can also be used for routing keys as well as data in encrypted form through the network without having such keys or data revealed at any intermediate node of the network.

Figure 2C:
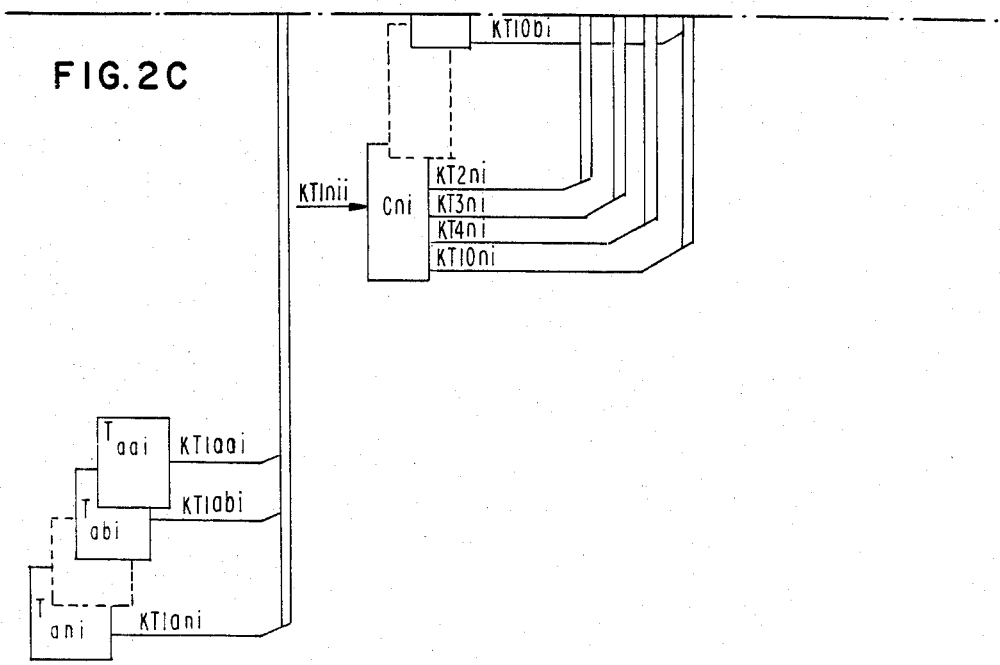
Figure 2:
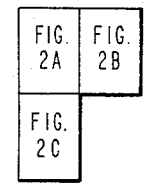
FIG. 2 is a diagram of how FIG. 2A to FIG. 2C may be placed to form a detailed block diagram.
Figure 2B:
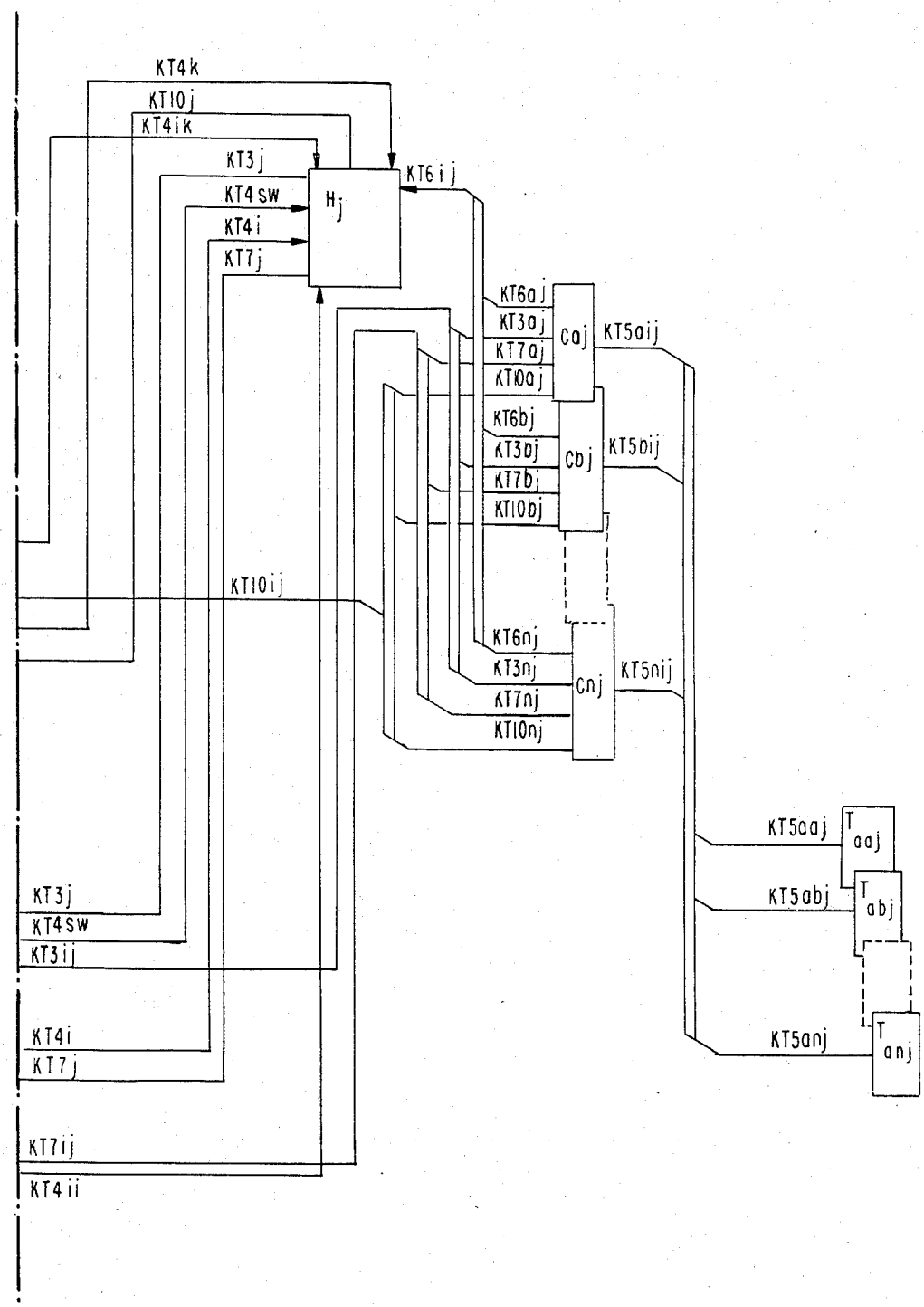

Referring now to FIG. 2, there is shown a block diagram of a representative interchange illustrating the arrangement of the transfer keys in the system. The representative interchange shown consists of three banks, i.e., Bank$_i$, Bank$_j$ and Bank$_k$, connected to a central system or switch SW. Turning first to a representative bank, e.g., Bank$_i$, the bank may have a central data processing system $H_i$ to which is connected a plurality of communiction controllers, i.e., $C_{ai}$, $C_{bi}$, ..., $C_{ni}$. Each controller, in turn, has a plurality of terminals connected thereto, e.g., terminals $T_{aai}$, $T_{abi}$, ..., $T_{ani}$, generally designated as $T_{aii}$, connected to the corresponding controller $C_{ai}$. Each of the other controllers will similarly have a set of terminals connected thereto, generally designated as $T_{bii}$, ..., $T_{nii}$ Each of the terminals of a set associated with a controller is provided with a terminal transfer key, e.g., KT1$_{aai}$, KT1$_{abi}$. . . KT1$_{ani}$, generally designated as KT1$_{aii}$ associated with the terminals $T_{aii}$. These keys are used to encipher the PIN at the entry to the terminal and for transfer to the next node of the system, namely, the communications controller and are considered as transfer-in keys at the controller. Each communication controller is provided with a unique authentication key, e.g., keys KT1$_{ai}$, KT1$_{bi}$-KT1$_{ni}$, generally designated as KT1$_{ii}$, and a transfer-out key to the next node in the system, e.g., KT2$_{ai}$ for transfers from the communication controller $C_{ai}$ to the host system $H_i$. If a prearranged agreement is made between a bank and the switch so that enciphered PINs may be transferred via the controller's associated host system, without further translation to the switch SW, then a key will be provided at the controller for that purpose, e.g., transfer key KT3$_{ai}$ for transfers from controller $C_{ai}$ to the switch SW. Similar arrangements may be made between the bank systems so that encrypted PINs may be routed via the associated host system and the switch SW to the designated other host systems without requiring re-encryption at each node, e.g., transfer keys KT4$_{ai}$ for transfers via $H_i$ and SW to $H_k$ and transfer key KT10$_{ai}$ via Host $H_i$ and SW to $H_k$ As will be apparent from the figure, each host system may receive enciphered PINs from their associated controllers, e.g., KT2$_{ii}$, from the controllers associated with the other host systems in the network, e.g., KT7$_{ik}$ and KT7$_{ij}$. Additionally, each host system may receive enciphered PINs from the other host systems using host transfer-out keys, e.g., KT7$_k$ from Host $H_k$ and KT7$_j$ from Host $H_j$. Lastly, each host system may receive enciphered PINs from the switch SW, e.g., transfer key KT7$_{sw}$. Each host system is connected to the switch SW as the next node in the system and, accordingly, a transfer-out key is provided at each host system for transmitting an enciphered PIN from each host system to the switch SW, e.g., KT3$_i$ from host $H_i$, KT3$_k$ from host $H_k$ and KT3$_j$ from host $H_j$. In addition, if the banks have made a prearranged agreement, then it is possible to transfer an enciphered PIN from a host system to one of the other host systems without requiring translation via the switch SW. For this purpose, transfer out keys are provided at each of the host systems, e.g., $KT4_i$ and $KT10_i$ for transfers from host $H_i$ to hosts $H_j$ and $H_k$, respectively: $KT7_j$ and $KT10_j$ for transfers from host $H_j$ to hosts $H_i$ and $H_k$, respectively and $KT7_k$ and $KT4_k$ for transfers from host $H_k$ to hosts $H_i$ and $H_j$, respectively. Accordingly, various in-bound and out-bound tables of transfer keys may be stored at each node of the system for routing the PIN to the proper node for the verification process to be performed.

Figure 5B:
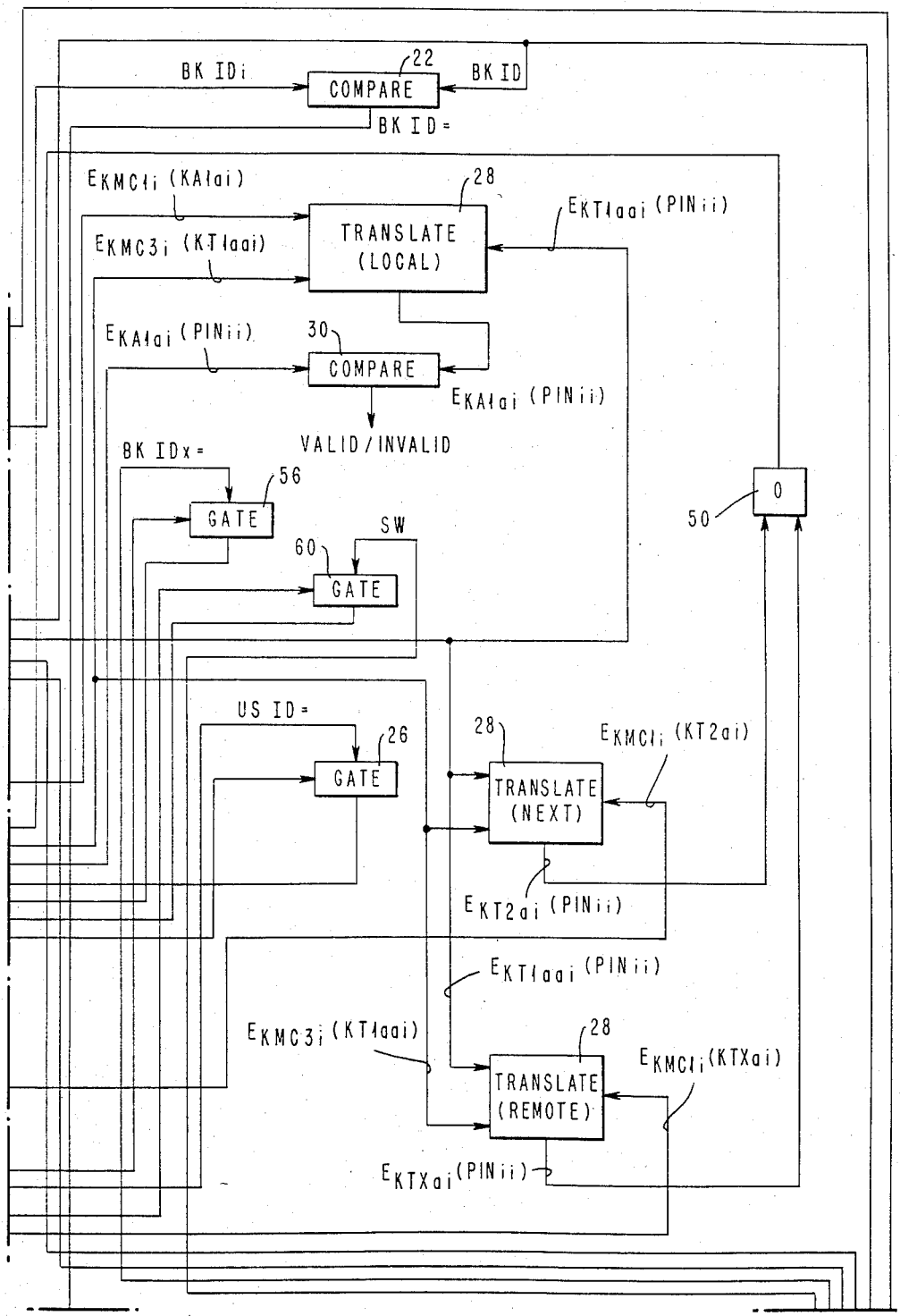
Figure 6:
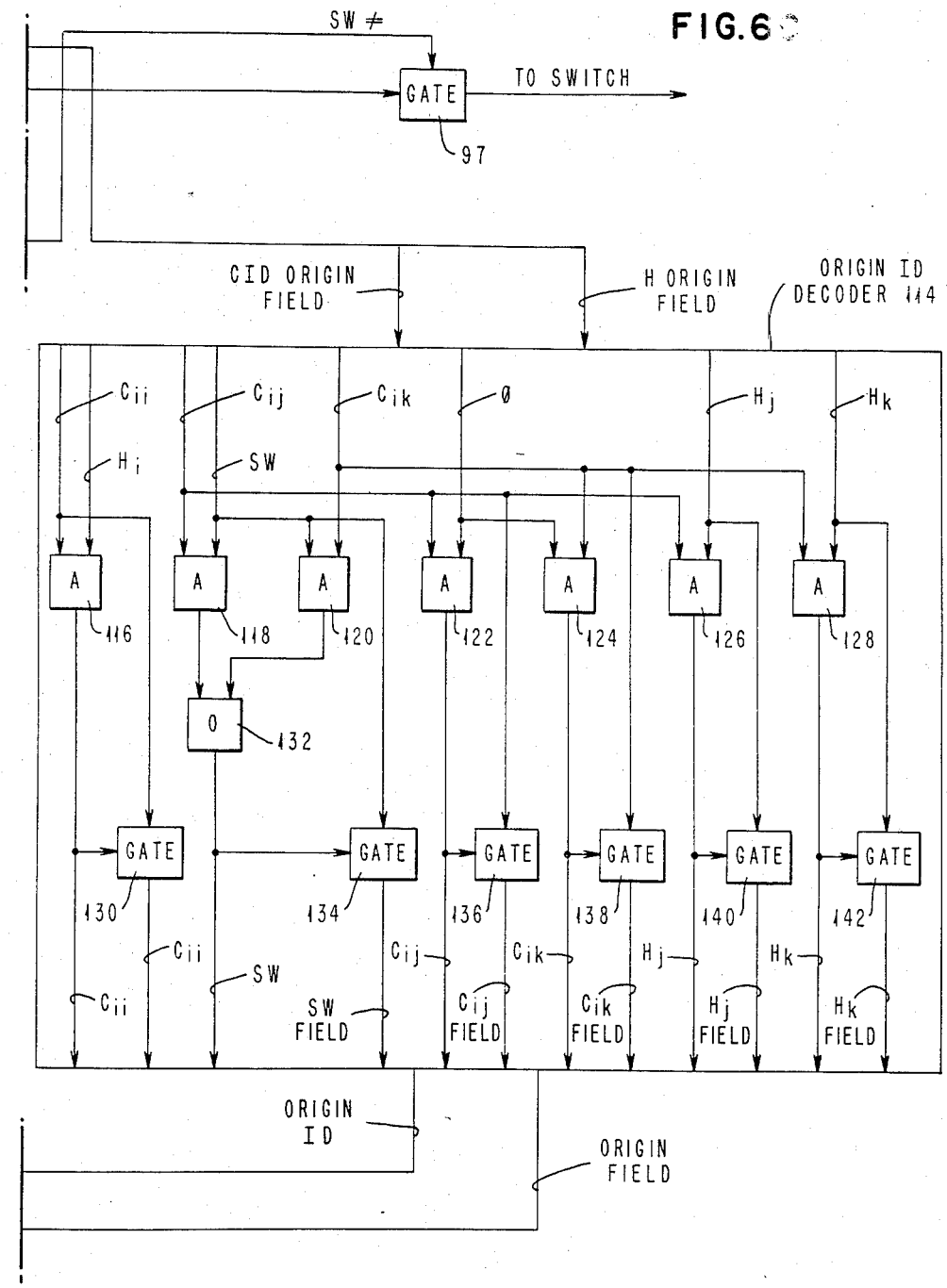
FIG. 6 is a diagram of how FIGS. 6A to 6E may be placed to form a detailed schematic diagram.

Referring now to FIG. 3, there is shown a series of diagrams illustrating the formatting and reformatting of origin and destination fields for the message flow from a representative controller to its associated host system or to one of the other host systems in the network, depending on the bank ID portion of the PAN. Thus, referring to FIG. 3A, there is illustrated the message flow from controller Cii to host $H_i$ where BK ID=$H_i$. In this case, Cii is placed in the CID origin field to identify the originating controller, host $H_i$ is placed in the host origin field to indicate the message is originating from host $H_i$ and host $H_i$ is placed in the destination field to indicate the message is destined for host $H_i$. Referring now to FIG. 3B, there is illustrated the message flow from controller Cii to host $H_j$ where BK ID=$H_j$. In this case, the same type of formatting is performed at the controller as in the case of FIG. 3A. At the host system, the only reformatting that is done is to replace the destination field with the switch SW value. At the switch, the message is reformatted whereby the host origin field id replaced with the SW value and the destination field is replaced with the $H_j$ value which is the destination for the message. Referring now to FIG. 3C, there is illustrated the message flow from controller Cii to host $H_k$ where BK ID=$H_k$. This case is similar to that illustrated in FIG. 3B except for the reformatting at the switch SW, in which case, the origin field is replaced by the value of SW and the destination field is replaced by the value of $H_k$ which is the destination for the message. Referring now to FIG. 3D, there is illustrated the message flow from controller Cii to host $H_j$ where BK ID=$H_j$ and no translation is required at host $H_j$. In this case, since the message is to be passed via host $H_i$, without translation, to the switch SW which is remote from the controller, then a zero value is inserted in the host origin field to indicate that this is a remote transfer and the SW value is placed in the destination field. As a result, this message will be passed unchanged via the host $H_i$ to the switch SW. At the switch SW, the host origin field will be replaced with the SW field and the destination field will be replaced by the $H_j$ value identifying the destination for the message. Referring now to FIG. 3E, there is illustrated the message flow from controller Cii to host $H_k$ where BK ID=$H_k$ and no translation is to be performed at the host $H_i$. This case is similar to that shown in FIG. 5D except for the last reformat operation in which the destination field is replaced with $H_k$ identifying the destination for the message. Referring now to FIG. 3F, there is illustrated the message flow from controller Cii to host $H_j$ where BK ID=$H_j$ and no translation is required at the switch SW. In this case, the origin and destination fields are formatted as in the case of FIG. 3A for transmission to the associated host $H_i$. At the host $H_i$, the only reformatting done is to replace the destination field with the $H_j$ value so that the message may be passed without further translation at the switch SW to the host $H_j$, the destination for the message. Referring now to FIG. 3G, there is illustrated the message flow from the controller Cii to host $H_k$ where BK ID=$H_k$ and the message is to be passed via the switch SW without further translation. This case is similar to that illustrated in FIG. 3F, except that at the host $H_i$, the destination field is replaced by the $H_k$ value to identify the destination for the message. Referring now to FIG. 3H, there is illustrated the message flow from controller Cii to host $H_j$ where BK ID=$H_j$ and the message is to be passed via the host $H_i$ and the switch SW without further translation to the host $H_j$. In this case, at the controller, a zero value is placed in the host origin field to indicate that this is a remote message transfer and the $H_j$ value is placed in the destination field to indicate the destination for the message. Accordingly, the origin and destination fields of the message are passed unchanged via the host $H_i$ and the switch SW to the host $H_j$. Referring now to FIG. 3I, there is illustrated the message flow from the controller Cii to the host $H_k$ where BK ID=$H_k$ and the message is to be passed via the host $H_i$ and the switch SW without translation. This case is similar to that illustrated in FIG. 3H except that the $H_k$ value is placed in the destination field to identify the destination host to receive the message.

Referring now to FIG. 4, there is illustrated in block diagram form, a cryptographic facility for performing a translate function operation. Various forms of cryptographic apparatus are presently available for carrying out encrypting and decrypting operations in accordance with the DES algorithm. One such type of apparatus is described in U.S. Pat. No. 4,238,853 issued Dec. 9, 1980. In the cryptographic facility is stored a system master key KM∅ and in carrying out the translate function four cryptographic operations are called for in a predetermined manner. In one type of operation, designated as a local translate operation, the PIN is translated from encryption under a transfer-in key to encryption under an authentication key, i.e., translation fro $E_{KTin}$ (PIN) to $E_{KA}$ (PIN). In a second type of operation, designated as either a next translate or remote translate operation, the PIN is translated from encryption under a transfer-in key to encryption under a transfer-out key, e.g., from $E_{KTin}$ (PIN) to $E_{KTout}$ (PIN).

In carrying out either operation, a first parameter $E_{KM3}$ ($KT_{in}$) is applied as the data parameter to a first decrypt operation. The master key KM∅ is read out of the crypto memory and predetermined bits are inverted to provide a second master key, i.e. KM3, which is a variant of the host master key, as the working key for the decrypt operation. Accordingly, the data parameter is decrypted under control of the second master key and the transfer-in key $KT_{in}$ is obtained as the working key for the next cryptographic operation. In the next cryptographic operation, the $E_{KTin}$ (PIN) is applied as a data parameter for the decrypt operation under control of the working key $KT_{in}$ to obtain the PIN which is retained for a subsequent cryptographic operation. Next, depending on whether the PIN is to be re-encrypted under an authentication key or under a transfer-out key, another parameter is provided as the data parameter for a decrypt operation, i.e, $E_{KM1}$ (KA) or $E_{KM1}$ ($KT_{out}$) The system master key KM∅ is again read out of the crypto memory and predetermined bits of the key are inverted to provide a third system key, i.e. KM1, which is another variant of the host master key, as the working key for a third decrypt operation for decrypting the encrypted authentication key or the encrypted transfer-out key which is then applied as the working key for an encrypt operation. The previously obtained PIN is then applied as a data parameter for the encrypt operation to yield a translated PIN value, i.e., $E_{KA}$ (PIN) or $E_{KTout}$ (PIN).

Referring now to FIGS. 5A to 5D, there is shown a functional block diagram of a communication controller illustrating the process of verifying, at the controller, the identity of a terminal user. In order to aid in the understanding of the present invention, a simplified block diagram is used to illustrate the various functional and cryptographic operations carried out at the controller. The controller illustrated, e.g. controller Cai, is representative of all the controllers in the network, the only difference being one of notation designation. Also illustrated is block diagram form are representative terminals Taai and Tabi, the former including an encrypting Pin Pad while the latter includes an integrated cryptographic facility. In the case of terminal Taai, the transaction code (TC) and transaction data (DATA) are entered at the keyboard, the PAN (which includes the system and user ID) is read from the user card into the terminal controller and the user enters the PIN at the keypad of the encrypting Pin Pad. Since the encrypting Pin Pad has a cryptographic facility, the pin entered via the keypad is encrypted under the terminal transfer key at the Pin Pad to provide a first encrypted pin, i.e. $E_{KT1aai}$ (PIN). In the case of terminal Tabi, PIN, TC and DATA are entered at the keyboard and PAN is read from the user card. In the integrated cryptographic facility of terminal Tabi, the PIN entered via the keyboard is encrypted under the terminal transfer key KT1abi to produce the enciphered PIN, i.e. $E_{KT1abi}$ (PIN). Regardless of which type of terminal is being used, the terminal includes a message generator which composes a message for transmission to the controller which may include the transaction code TC, the transaction data DATA, a sequence number SEQ #, used during message authentication, the enciphered PIN value, the PAN, and a terminal identification number (TID) which identifies the terminal as the origin of the message. Using normal data communication protocols, the transaction message is transmitted from the terminal via the loop to the associated controller, e.g. controller Cai, which includes an adapter for receiving the message.

Upon receiving the message, a message receive (MSG REC) signal is generated and applied to the select circuits 4 to initiate a TID select operation. In carrying out the TID select operation, the select circuits 4 provides the base address of the input transfer key table 6 in the memory 16 to initiate a table look up operation to determine whether there is an entry in the table corresponding to the TID contained in the input transaction message. Accordingly, each entry of the table is compared at compare unit 18, with the TID contained in the message. When a comparison is found, i.e. TID=, a positive signal is applied to condition gate 20 to pass the corresponding encrypted terminal transfer key to the temporary store location 12 in memory 16. The select circuits 4 next address a fixed location 7 which contains the encrypted authentication key, preceded by the associated bank identification (BK ID) The BK ID value is read out and compared, at compare unit 22, with the BK ID contained in the input transaction message. If a comparison is found, a BK ID= signal is applied to the select circuits 4 to initiate a user identification (US ID) select operation. In carrying out the US ID select operation, the select circuits 4 provide the base address of the PIN table 10 in the memory 16 to initiate a table lookup operation to determine whether there is an entry in the table corresponding to the US ID contained in the PAN portion of the input transaction message. Accordingly, each entry of the table is compared, at compare unit 24, with the US ID contained in the message. When a comparison is found, i.e. US ID=, a positive signal is applied to condition gate 26 to pass the corresponding encrypted PIN entry from the PIN table 10 to the temporary store location 13 in memory 16. At this point, it should be apparent that since both the BK ID= and US ID= signals were obtained, the terminal user is a member of the bank at which the transaction is to take place and that his or her account is contained in the branch associated with this controller, i.e. controller Cai. Therefore, verification of the identity of the terminal user can be accomplished at the local controller. This is accomplished by carrying out a local translate operation to decrypt the encrypted PIN from the input transfer key and reencrypt it under the controller's authentication key to yield an authentication parameter. Accordingly, when the user ID= signal is obtained, it is also applied to the select circuits 4 to initiate a local translate operation.

In carrying out the local translate operation, assuming the input message was received from terminal Taai, the select circuits 4 addresses temporary store 12 to read out the encrypted terminal transfer key i.e. $E_{KMC3i}$ (KT1aai), to the cryptographic facility 28 where it is decrypted under control of a variant KMC3i, of the controller system key, i.e. KMC0i, to obtain the transfer-in key, i.e. the terminal transfer key KT1aai, as the working key for the next cipher operation, as illustrated in FIG. 4. The encrypted PIN, i.e. $E_{KT1aai}$(PINii), from the input transaction message is next applied to the crypto facility where a decrypt operation is performed under control of the terminal transfer key, i.e. KT1aai, in order to obtain the PINii, which is retained in the crypto facility, as illustrated in FIG. 4. The select circuits 4 then addresses location 7 in the memory 16 to read out the authentication key entry, i.e. $E_{KMC1i}$ (KA1ai), to the crypto facility 28 where it is decrypted under another variant, i.e. KMCli, of the controller system key, to derive the authentication key, i.e. KA1ai, as the working key for the next cryptographic operation, as illustrated in FIG. 4. Accordingly, the crypto facility next encrypts PINii under the authentication key KA1ai to produce an authentication parameter, i.e. $E_{KA1ai}$ (PINii) The select circuits 4 next addresses the temporary store 13 to obtain the authentication parameter of reference which is compared, at compare unit 30, with the authentication parameter provided by the cryptographic facility to provide an indication that the identity of the terminal user is valid or not.

If US ID= had not been obtained as a result of the US ID comparison, i.e. US ID≠, indicating that the terminal user, while a member of the bank at which the transaction is to be performed, does not have an account at the branch associated with the local controller, i.e. controller Cai, and that verification must be made at the next data processing node, i.e. at host $H_i$. Accordingly, if a US ID comparison is not obtained, a negative signal on the US ID= line is inverted by inverter 32 to a positive US ID≠ signal and in combination with the positive signal on the BK ID= line renders the AND circuit 34 effective to apply a positive signal via the OR circuit 48 to the select circuits 4 to initiate a next translate operation. In carrying out the next translate operation, the select circuits 4 addresses temporary store 12 to read out the encrypted terminal transfer key, i.e. $E_{KMC3i}$ (KT1aai), to the cryptographic facility 28 where it is decrypted under control of the variant KMC3i of the controller system key to obtain the terminal transfer key i.e. KT1aai as the working key for the next cipher operation. The encrypted PIN, i.e. $E_{KT1aai}$ (PINii), from the input transaction message is next applied to the crypto facility where a decrypt operation is performed under control of the terminal transfer key, i.e. KT1aai, in order to obtain the PINii which is retained in the crypto facility. The select circuits 4 then addresses location 9 in the memory 16 to read out the encrypted transfer-out key designated for PIN transfers to $H_i$, i.e., $E_{KMC1i}$ (KT2ai), to the crypto facility 28 where it is decrypted under another variant, i.e. KMC1i, of the controller system key, to derive the transfer-out key, i.e. KT2ai, as the working key for the next cryptographic operation. Accordingly, the crypto facility next encrypts PINii under the transfer-out key KT2ai to produce a reencrypted PIN, i.e. $E_{KT2ai}$ (PINii), which is applied via OR circuit 50 to replace the encrypted PIN field of the input transaction message as part of the reformatting of the input message to form a transaction output message. Additionally, a controller identification i.e. Cai, Cbi or Cni, generally represented as Cii, is added as a CID origin field to the output message to identify the origin controller which is transmitting the message. Also added to the message is a host origin field which contains the identification of the host system associated with the transmitting controller, e.g. $H_i$. Further appended to the message is a destination field, which identifies the destination for the message, which in this case, is the host system associated with the controller, e.g. $H_i$.

If the user had not been found to be a member of this bank, i.e. BK ID≠, then a determination must be made whether the controller has stored a transfer-out key to any of the other host systems of the network or to the switch SW. Accordingly, a negative signal on the BK ID= line is inverted by the inverter 52 to a positive signal on the BK ID≠ line which is applied to the select circuits 4 to initiate a BK IDx select operation. In carrying out the BK IDx select operation, the select circuits 4 provide the base address of the output transfer key table 8 in the memory 16 to initiate a table lookup operation to determine whether there is an entry in the table corresponding to the BK ID contained in the input transaction message. Accordingly, each entry of the table is compared, at compare unit 54 with the BK ID contained in the message. When a comparison is found, i.e. BK IDx=, gate 56 is conditioned to pass the corresponding encrypted transfer-out key from the output transfer key table 8 to the temporary store location 14 in memory 16. The BK IDx= signal is also applied to the select circuits 4 to initiate a remote translate operation. In carrying out the remote translate operation, the select circuits 4 addresses temporary store 12 to readout the encrypted terminal transfer-in key, i.e. $E_{KMC3i}$ (KT1aai), to the cryptographic facility 28 where it is decrypted under control of the variant KMC3i of the control system key, to obtain the terminal transfer-in key as the working key for the next cipher operation. The encrypted PIN i.e., $E_{KT1aai}$ (PINii), from the input transaction message is next applied to the crypto facility where a decrypt operation is performed under control of the terminal transfer key, i.e. KT1aai, in order to obtain the PINii, which is retained in the crypto facility. The select circuits 4 than addresses temporary store 14 to read out the encrypted transferout key, i.e. $E_{KMC1i}$ (KT4ai/KT10ai), to the cryptographic facility 28 where it is decrypted, under variant KMC1i of the controller system key, to derive the transfer-out key, i.e. KT4ai or KT10ai, depending on which was selected from the output transfer key table 8. The transfer-out key is then applied as the working key for the next cryptographic operation, which is to encrypt the PINii under the transfer-out key to produce the new encrypted PIN, i.e. $E_{KT4ai}$ (PINii) or $E_{KT10ai}$ (PINii), depending on which transfer-out key was selected from the output transfer key table 8. The newly encrypted PIN is applied via the OR circuit 50 to replace the encrypted PIN field of the input transaction message as part of the reformatting of the input transaction message to an output transaction message for transmission to the remote data processing node. Additionally, the controller identification, i.e. CIDai, is added to the CID origin field of the output transaction message. Since the message is to be transmitted to a remote host system, a zero value is added to the host origin field to indicate that this is a remote transfer message. Further appended to the output transaction message is the remote host identification, i.e. $H_j$ or $H_k$, which is added to the destination field of the output transaction message to identify the destination for the message.

If the user has not been found to be a member of this bank, i.e. BK ID≠ and if a transfer-out key entry has not been found in the outbound key table 8 for a remote bank, i.e. BK IDx≠, then a determination must be made as to whether there is a SW entry in the output transfer key table 8. If a prearranged agreement was made between the local bank, i.e. Bank$_i$, and the SW so that the presently enciphered PIN may be transferred to the switch via the associated host system, i.e. host $H_i$, without further translation, then a transfer-out key entry will be provided in the last position of the output transfer key table 8 and a latch 42 will have been set, as part of the prearrangement, to provide a positive signal on the SW line. The positive SW signal from the latch 42 is applied to one input of the AND circuit 40. Additionally, since a BK IDx= was not obtained from compare unit 54, then a negative signal on the BK IDx= line is inverted by the inverter 36 to a positive signal on the BK IDx≠ line which, together with a positive signal on the BK ID≠ signal, render the AND circuit 38 effective to apply a positive signal to the other input of the AND circuit 40 to render it effective to apply a positive signal to condition gate 60 to transfer the encrypted transfer-out key to switch SW from the last position in the output transfer key table 8 to the temporary store location 15 in memory 16. The positive signal from the AND circuit 40 is also applied to the select circuits 4 to initiate a SW translate operation.

In carrying out the SW translate operation, which is a remote translate type of operation, the select circuits 4 addresses temporary store 12 to read out the encrypted transfer-in key to the cryptographic facility 28 where it is decrypted under control of the KMC3i variant of the controller system key to obtain the terminal transfer-in key as the working key for the next cipher operation. The encrypted PIN from the input transaction message is next applied to the crypto facility 28 where a decrypt operation is performed under control of the transfer-in key in order to obtain the PINii which is retained in the crypto facility. The select circuits 4 then address the temporary store location 15 in memory 16 to read out the enciphered transfer-out key which is applied to the crypto facility where it is decrypted under the variant KMHli of the controller system key to derive the transfer-out key, i.e. KT3ai. The transfer-out key is then applied as the working key for the next cryptographic operation, which is to encrypt the PINii under the transfer-out key to produce a newly enciphered PIN, i.e. $E_{KT3ai}$(PINii) This is a variant of the remote translate type of operation previously described, the only difference being the encrypted transfer-out key being used, which, in this case, is KT3ai for a transfer to the switch SW rather than KT4ai or KT10ai which were used for transfers to the other host systems, i.e. $H_j$ or $H_k$, respectively.

This newly enciphered PIN is applied via the OR circuit 50 to replace the encrypted PIN field of the input transaction message as part of the reformatting of the input transaction message to an output transaction message for transmission to the switch SW. Additionally, the controller identification, CIDai, is added to the CID origin field of the output transaction message. Since the message is to be transmitted to the switch SW without translation at the host, a zero value is added to the host origin field to indicate that this is a remote transfer message. Further appended to the output transaction message is the switch identification SW, which is added to the destination field of the output transaction message to identify the destination for the message.

If the user had not been found to be a member of this bank, i.e. BK ID≠ and if a transfer-out key entry had not been found in the output transfer key table 8 for a remote bank, i.e. BK IDx≠, and no prearranged agreement had been made with the switch SW so that the latch 42 is not set, then only a next translate operation can be performed. The latch 42 in not being set causes a negative signal to be applied to the SW line which is inverted by inverter 44 to apply a positive signal to one input of the AND circuit 46. Also, positive signals on the BK ID≠ and BK IDx≠ lines are applied to render the AND circuit 38 effective to apply a positive signal to the conditioned AND circuit 46 which is rendered effective to apply a positive signal via the OR circuit 48 to the select circuits 4 to initiate a next translate operation which is carried out, in the manner as previously described, to decrypt the enciphered pin under control of the transfer-in key and re-encrypted it under the transfer-out key for the next data processing node, i. e. host $H_i$.

Referring now to FIGS. 6A to 6E, there is shown a functional block diagram of a host data processing system illustrating the process of verifying at the host system, the identity of a terminal user. In order to aid in the understanding of the present invention, a simplified block diagram is used to illustrate the various functional cryptographic operations carried out at the host system. The host system illustrated in FIGS. 6A to 6E, i.e. host $H_i$, is representative of all the hosts in the network, the only difference being one of notation designation.

Upon receiving a transaction message at the host system, a message received (MSG REC) signal is generated and applied to the select circuits 70 to initiate a destination (DEST) select operation. In carrying out the DEST select operation, a first determination must be made as to whether this host system is the destination for the transaction message. Accordingly, the select circuits 70 addresses a fixed location 72 in memory 100 which contains a host identification value. The $H_i$ is read out and compared, at compare unit 95, with the DEST field contained in the input transaction message. If a comparison is not found, a negative signal is applied to the H= line which is inverted by inverter 96 and applied via the H≠ line to condition gate 97 to transfer the input transaction message to the destination designated by the destination field. On the other hand, if a comparison is found, a H= signal is applied to the select circuits 70 to initiate a BK ID select operation. In carrying out a BK ID select operation, the select circuits 70 address a fixed location 74 which contains the encrypted authentication key, preceded by the associated local BK ID. The BK ID value is read out and compared, at compare unit 98, with the BK ID contained in the input transaction message. If a comparison is found a BK ID= signal is applied to gate 112 to cause the origin fields of the input transaction message to be transferred to the origin ID decoder 114. The decoder 114 includes a plurality of AND circuits 116 through 128 which are rendered effective in accordance with the origin fields of the input transaction message. Thus, AND circuit 116, when rendered effective, applies a positive signal to the Cii line to indicate that the origin of the message was from controller Cii. The AND circuits 118 or 120 when rendered effective apply a positive signal via the OR circuit 132 to the SW line to indicate that the switch was the origin of the input message. In a similar manner each of the other AND circuits 122 to 128, if rendered effective, cause a positive signal to be applied to the Cij, Cik, $H_j$ and $H_k$ lines, respectively, to identify the origin of the input message. Associated with the AND circuits are a series of gates 130 to 142 which are conditioned in accordance with the AND circuit that was rendered effective to pass a field corresponding to the origin of the input message. The origin ID signals and the origin field signals are applied to the select circuits 70. The BK ID= signal is also applied to the select circuits 70 to initiate an origin select operation. In carrying out the origin select operation, the select circuits 70, in response to the decoded origin ID signal from decoder 114, provides the base address of the associated controller input transfer key table 76, 78, 80 or 82 to initiate a table look-up operation to determine whether there is an entry in the table corresponding to the decoded origin field. Accordingly, if a controller table has been selected, each entry of the table is applied via OR circuit 144 and compared, at compare unit 146, with the CID origin field from the input message. When a comparison is found, i.e. CID= a positive signal is applied via OR circuits 150 and 152 to condition gate 154 to pass the corresponding encrypted transfer-in key to a temporary store location 88 in memory 100. On the other hand, if the origin ID signal indicates the origin of the message was $H_j$, $H_k$ or switch SW then either of these signals are effective to cause the select circuits 70 to provide the base address of the host/SW input transfer key table 82 in memory 100 to initiate a table look-up operation to determine whether there is an entry in the table corresponding to the origin field provided by the decoder 114. Accordingly, each entry of the table is compared, at compare unit 148, with the host origin field from input message. When a comparison is found, i.e. H/SW=, a positive signal is applied via the OR circuits 150 and 152 to condition gate 154 to pass the corresponding encrypted transfer-in key from table 82 to a temporary store location 88 in memory 100. Thus, it should be apparent that compare units 146 and 148 provide an origin selected signal via the OR circuit 150 which signal is also applied to the select circuits 70 to initiate a US ID select operation.

In carrying out the US ID select operation, the select circuits 70 provide the base address of the PIN table 86 in the memory 100 to initiate a table look-up operation to determine whether there is an entry in the table corresponding to the US ID contained in the PAN of the input transaction message. Accordingly, each entry of the table is compared, at compare unit 156, with the US ID contained in the message. When a comparison is found, i.e. US ID=, a positive signal is applied to condition gate 158 to pass the corresponding encrypted PIN entry from the PIN table 86 to a temporary store location 90 in memory 100. At this point, it should be apparent that since both the BK ID= and US ID= signals were obtained, the terminal user is a member of the bank at which the transaction is to take place and that his other account information is contained at this host. Therefore, verification of the identity of the terminal user can be accomplished at the host. This is achieved by carrying out a local translate operation to decrypt the encrypted pin under control of the transfer-in key and reencrypt it under the host's authentication key to yield an authentication parameter. Accordingly, when the user ID= signal is obtained, it is also applied to the select circuit 70 to initiate a local translate operation.

In carrying out the local translate operation, the select circuits 70 address temporary store location 88 to read out the encrypted transfer-in key, i.e. $E_{KMH3i}$(KT2xx) if the input message was being received from an associated controller or $E_{KMH3i}$ (KT7x) if the input message was being received from the switch SW, one of the other host systems $H_j$ or $H_k$, or one of the controllers associated with one of the other host systems, to the cryptographic facility 158 where it is decrypted under control of a variant, i.e. KMH3i, of the host system key, to obtain the transfer-in key as the working key for the next cipher operation. The encrypted PIN, i.e. $E_{KT2xx}$ (PINii) or $E_{KT7x}$ (PINii), obtained from the input transaction message is next applied to the crypto facility where a decrypt operation is performed under control of the transfer-in key in order to obtain the PINii, which is retained in the crypto facility. The select circuit 70 then addresses location 74 in the memory 100 to read out the encrypted authentication key, i.e. $E_{KMH1i}$(KA2i), to the crypto facility 158 where it is decrypted under another variant, i.e. KMH1i, of the host system key, to derive the authentication key as the working key for the next cryptographic operation. Accordingly, the crypto facility next encrypts PINii under the authentication key to produce an authentication parameter, i.e. $E_{KA2i}$(PINii). The select circuits 70 next address the temporary store 90 to obtain the authentication parameter of reference which is compared at compare unit 160 with the authentication parameter provided by the crypto facility to provide an indication that the identity of the terminal user is valid or not.

If the user has not been found to be a member of this bank, i.e. BK ID≠, then a determination must be made whether the host system has stored a transfer-out key to any of the other host systems of the network or to the switch SW. Accordingly, a negative signal on the BK ID≠ is inverted by inverter 162 to a positive signal on the BK ID≠ line which is applied to the select circuits 70 to initiate a CID select operation. In carrying out the CID select operation, the select circuits 70 provide the base address of the controller input transfer key table 76 in the memory 100 to initiate a table look-up operation to determine which local controller the input transaction message is being received from. Accordingly, each entry of the addressed key table 76 is compared, at compare unit 164, with the CID contained in the origin field of the message. When a comparison is found, i.e. CID=, a positive signal is applied via the OR circuit 152 to condition the gate 154 to pass the corresponding encrypted transfer-in key from the addressed key table 76 to a temporary store location 88 in memory 100. The CID= signal is also applied to the select circuits 70 to initiate a BK IDx select operation. In carrying out the BK IDx select operation, the select circuits 70 provides the base address of the output transfer key table 84 in the memory 100 to initiate a table look-up operation to determine whether there is an entry in the table corresponding to the BK ID contained in the input transaction message. Accordingly, each entry of the table is compared, at compare unit 166, with the BK ID contained in the message. When a comparison is found, i.e. BK IDx=, gate 168 is conditioned to pass the corresponding encrypted transfer-out key from the output transfer key table 84 to a temporary store location 92 in memory 100. The BK IDx= signal is also applied to the select circuits 70 to initiate a remote translate operation. In carrying out the remote translate operation, the select circuits 70 addresses temporary store 88 to read out the encrypted terminal transfer-in key to the cryptographic facility 158 where it is decrypted under control of a variant of the host system key, i.e. KMH3i, to obtain the transfer-in key as the working key for the next cipher operation. The encrypted PIN obtained from the input transaction message is next applied to the crypto facility where a decrypt operation is performed under control of the transfer-in key in order to obtain the PINii, which is retained in the crypto facility. The select circuits 70 then addresses temporary store location 94 to read out the encrypted transfer-out key to the crypto facility 158 where it is decrypted under the variant of the host system key, e.g. KMH1i, to derive the transfer-out key, i.e. KT4i or KT10i, depending on which was selected from the output transfer key table 84. The transfer-out key is then applied as the working key for the next cryptographic operation, which is to encrypt the PINii under the transfer-out key to produce the new encrypted PIN, i.e. $E_{KT4i}$ (PINii) or $E_{KT10i}$(PINii), depending on which transfer-out key was selected from the out key table 84. The newly encrypted pin is applied via the OR circuit 170 to replace the encrypted PIN field of the input transaction message as part of the reformatting of the input transaction message to an output transaction message for transmission to one of the remote data processing nodes. Since the message is to be transmitted to a remote host system, the host origin field remains unchanged and the destination field is updated to identify the remote destination, i.e. $H_j$ or $H_k$, for the output transaction message.

If the user had not been found to be a member of this bank, i.e. BK ID≠ and if a transfer-out key entry had not been found in the output transfer key table 84 for a remote bank, i.e. BK IDx≠, then a transfer-out key (to the switch SW) will be provided as the last entry in the table 84. Since a BK IDx= was not obtained from the compare unit 166, then a negative signal on the BK IDx= is inverted by the inverter 172 to a positive signal on the BK IDx≠ line which is applied to condition the gate 174 to transfer the encrypted transfer-out key from the output transfer key table 84 to a temporary store location 94 in memory 100. The positive signal on the BK IDx≠ line is also applied to the select circuit 70 to initiate a next translate operation.

In carrying out the next translate operation, the select circuits 4 address temporary store 88 to read out the encrypted transfer-in key to the crypto facility 158 where it is decrypted under control of a variant, e.g. KMH3i, of the host system key to obtain the transfer-in key as the working key for the next cipher operation. The encrypted PIN from the input transaction message is next applied to the crypto facility where a decrypt operation is performed under control of the transfer-in key in order to obtain the PINii which is retained in the crypto facility. The select circuits 70 then address location 94 in the memory 100 to read out the encrypted transfer-out key to the crypto facility 158 where it is decrypted under another variant, i.e. KMH1i, of the host system key to derive the transfer-out key as the working key for the next cryptographic operation. Accordingly, the crypto facility next encrypts PINii under the transfer-out key to produce a re-encrypted PIN, i.e. $E_{KT3i}(PINii)$, which is applied via the OR circuit 170 to replace the encrypted PIN field of the input transaction message as part of the reformatting of the input message to form an output transaction message. The destination field is updated to replace the current field with the identification of the destination for the message, which in this case, is the switch SW.

Figure 7C:
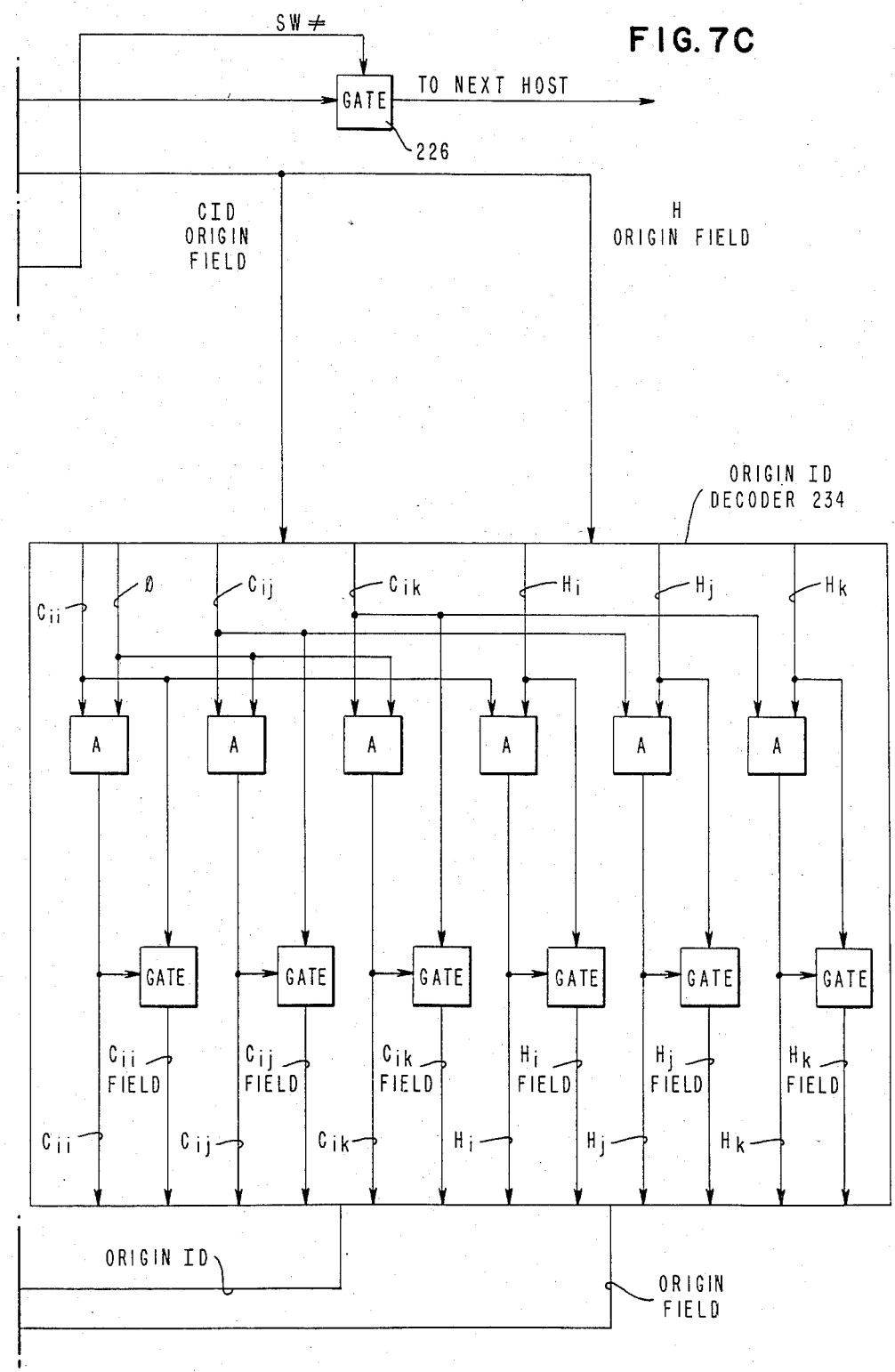

Referring now to FIGS. 7A to 7C, there is shown a functional block diagram of a switch SW. In order to aid in the understanding of the present invention, a simplified block diagram is used to illustrate the various functional and cryptographic operations carried out at the switch.

Upon receiving a transaction message at the switch SW, a message received (MSG REC) signal is generated and applied to the select circuits 200 to initiate a destination (DEST) select operation. In carrying out the DEST select operation, a first determination must be made as to whether the switch SW is the destination for the transaction message. Accordingly, the select circuits 200 address a fixed location 202 in memory 220 which contains a switch SW identification value. The SW value is read out and compared, at compare unit 222, with the DEST field contained in the input transaction message. If a comparison is not found, a negative signal is applied to the SW= line which is inverted by inverter 224 and applied via the SW≠ to condition the gate 226 to transfer the input transaction message to the destination designated by the destination field. On the other hand, if a comparison is found, a SW= signal is applied to the select circuits 200 to initiate a BK ID select operation. In carrying out a BK ID select operation, the select circuits provide the base address of the output transfer key table 212 in the memory 220 to initiate a table look-up operation. Accordingly, each entry of the table is compared, at compare unit 228, with the BK ID contained in the received message. When a comparison is found, i.e. BK ID=, gate 230 is conditioned to pass the corresponding encrypted transfer-out key from the output transfer key table 212 to a temporary store location 214 in memory 220. The BK ID= signal is also applied to the select circuits 200 to initiate an origin select operation. In carrying out the origin select operation, the select circuits 200 applies a signal to condition gate 232 to transfer the origin fields of the input transaction message to the origin ID decoder 234. The decoder 234 decodes these fields, in a manner similar to that described with respect to the decoder of the host system, to provide an origin ID signal which identifies the origin of the input message and an origin field signal corresponding to the origin of the input message. The origin ID signal lines and the origin field signal lines are connected to the select circuits 200. The select circuits 200, in response to a decoded origin ID signal, provides the base address of the associated one of the input transfer key tables 204, 206, 208 or 210 to initiate a table look-up operation to determine whether there is an entry in the table corresponding to the decoder origin field. Accordingly, if a controller table has been selected, each entry of the table is applied to the origin select circuits 236 and compared with the CID origin field from the input message. When a comparison is found, an origin selected signal is applied to condition gate 238 to pass the corresponding encrypted transfer-in key to a temporary store location 214 in memory 220. On the other hand, if the origin ID signal indicates that the origin of the message is $H_i$, $H_j$ or $H_k$, then either of these signals are effective to cause the select circuits 200 to provide the base address of the host key table 210 in memory 220 to initiate a table look-up operation to determine which entry in the table corresponds to the origin field provided by the decoder. Accordingly, each entry of the table is compared, in the origin select circuits 236, with the host origin field from the input message. When a comparison is found, a positive signal is applied via the origin selected line to condition gate 238 to pass the corresponding encrypted transfer-in key from table 210 to a temporary store location 214 in memory 220. The positive signal on the origin selected line is also applied to the select circuits 200 to initiate a next translate operation.

In carrying out the next translate operation, the select circuits 200 address temporary store location 214 to read out the encrypted transfer-in key, i.e. $E_{KMH3sw}(KT3xx)$ or $E_{KMH3sw}(KT3x)$, depending upon whether the input message is being received from a controller or a host system, to the cryptographic facility 242 where it is decrypted under control of the variant KMH3sw of the switch system key to obtain the transfer-in key, i.e. KT3xx or KT3x, as the working key for the next cipher operation. The encrypted PIN, i.e. $E_{KT3xx}(PINii)$ or $E_{KT3x}(PINii)$, from the input transaction message is next applied to the crypto facility where a decrypt operation is performed under control of the transfer-in key in order to obtain the PINii which is retained in the crypto facility. The select circuits 200 then address location 216 in the memory 220 to read out the encrypted transfer-out key, i.e. $E_{KMH1sw}(KT4/KT7/KT10)$ to the crypto facility 242 where it is decrypted under another variant, i.e. KMH1sw, of the switch system key to derive the transfer-out key, i.e. KT4sw, KT7sw or KT10sw, as the working key for the next cryptographic operation. Accordingly, the crypto facility next encrypts PINii under the transfer-out key to produce a re-encrypted pin, i.e. $E_{KT4sw}(PINii)$, $E_{KT7sw}(PINii)$ or $E_{KT10sw}(PINii)$, which replaces the encrypted PIN field of the input transaction message as part of the reformatting of the input message to form an output transaction message. The host origin field of the input transaction message is updated for the output transaction message by replacing the present contents with the SW value to now indicate the origin source of the message as the switch. Also updated is the destination field to replace the present contents with the $H_i$, $H_j$ or $H_k$ value identifying the host destinations of the transaction message.

While it is efficient to use variants of a master key to provide protection for various transfer keys used in the system, it is well within the skill of the art to provide separate master keys instead of variants of a single master key. This could be accomplished by providing separate master key memories each being loaded with a master key which is different than each other and being accessed when needed.

While the invention has been particularly shown and described with reference to the preferred embodiment thereof, it will be understood by those skilled in the art that several changes in form and detail may be made without departing from the spirit and scope of the invention.

What is claimed is:

1. In a system providing data communication between a terminal at which data is entered and a plurality of data processing systems, each having cryptographic apparatus and said terminal being provided with a transfer-in key associated with a first one of said data processing systems, a process for performing a data translate operation in a secure manner comprising the steps of:
   encrypting said data at said terminal under said transfer-in key to obtain first encrypted data,
   transmitting a message including at least said first encrypted data from said terminal to said first data processing system,
   providing a first host parameter at said first data processing system representing said transfer-in key encrypted under a first system master key of said first data processing system,
   providing a second host parameter at said first data processing system representing a first transfer-out key associated with a second one of said plurality of data processing systems encrypted under a second system master key of said first data processing system, with said first and second system master keys being different from each other, and
   performing a first translate operation at said first data processing system in accordance with said first and second host parameters to translate said data from encryption under said transfer-in key to encryption under said first transfer-out key for transmission to said second data processing system.

2. In the process as defined in claim 1 wherein said first translate operation performed at said first data processing system includes the steps of:
   providing said first system master key of said first data processing system,
   decrypting said first host parameter under control of said first system master key to obtain said transfer key,
   decrypting said encrypted data under control of said transfer key to obtain said data,
   providing said second system master key of said first data processing system,
   decrypting said second host parameter under control of said second system master key to obtain said first transfer-out key, and
   encrypting said data under control of said first transfer-out key for transmission to said second data processing system.

3. In the process as defined in claim 1 wherein said second data processing systems is next associated with said first data processing system, further including the steps of:
   providing a third host parameter at said first data processing system representing a second transfer-out key associated with a third data processing system which is remote from said first data processing system encrypted under said second system master key, and
   performing a second translate operation at said first data processing system in accordance with said first and third host parameters to translate said data from encryption under said transfer-in key to encryption under said second transfer-out key for transmission to said remote third data processing system.

4. In the process as defined in claim 3 wherein said second translate operation performed at said first data processing system includes the steps of:
   providing said first system master key of said first data processing system,
   decrypting said first host parameter under a control of said first system master key to obtain said transfer key,
   decrypting said encrypted data under control of said transfer key to obtain said data,
   providing said second system master key of said first data processing system,
   decrypting said third host parameter under control of said second system master key to obtain said second transfer-out key, and
   encrypting said data under control of said second transfer-out key for transmission to said remote third data processing system.

5. In a system providing data communication between a plurality of data processing systems, each having cryptographic apparatus and a first one of said plurality of data processing systems being provided with a transfer-in key associated with a second one of said data processing systems, a process for performing a data translate operation in a secure manner comprising the steps of:
   encrypting said data at said first data processing system under said transfer-in key to obtain first encrypted data,
   transmitting a message including at least said first encrypted data from said first data processing system to a second one of said plurality of data processing systems,
   providing a first host parameter at said second data processing system representing said transfer-in key encrypted under a first system master key of said second data processing system,
   providing a second host parameter at said second data processing system representing a first transfer-out key associated with a third one of said plurality of data processing systems encrypted under a second system master key of said second data processing system, with said first and second system master keys being different from each other, and
   performing a first translate operation at said second data processing system in accordance with said first and second host parameters to translate said data from encryption under said transfer-in key to encryption under said transfer-out key for transmission to said third data processing system.

6. In the process as defined in claim 5 where said first translate operation performed at said second data processing system includes the steps of:
- providing said first system master key of said second data processing system,
- decrypting said first host parameter under control of said first system master key to obtain said transfer key,
- decrypting said encrypted data under control of said transfer key to obtain said data,
- providing said second system master key of said second data processing system,
- decrypting said second host parameter under control of said second system master key to obtain said first transfer-out key, and
- encrypting said data under control of said first transfer-out key for transmission to said third data processing system.

7. In the process as defined in claim 5 wherein said second data processing system is next associated with said first data processing system further including the steps of:
- providing a third host parameter at said second data processing system representing a second transfer-out key associated with a fourth data processing system which is remote from said second data processing system encrypted under said second system master key, and
- performing a second translate operation at said second data processing system in accordance with said first and third host parameters to translate said data from encryption under said transfer-in key to encryption under said second transfer-out key for transmission to said remote fourth data processing system.

8. In the process as defined in claim 7 wherein said second translate operation performed at said second data processing system includes the steps of:
- providing said first system master key of said second data processing system,
- decrypting said first host parameter under control of said first system master key to obtain said transfer key,
- decrypting said encrypted data under control of said transfer key to obtain said data,
- providing said second system master key of said second data processing system,
- decrypting said third host parameter under control of said second system master key to obtain said second transfer-out key, and
- encrypting said data under control of said second transfer-out key for transmission to said remote fourth data processing system.

9. In a system providing data communication between a terminal at which data is entered and a data processing system, each having cryptographic apparatus and said terminal being provided with a transfer key, a process for verifying at said data processing system the data entered at said terminal comprising the steps of:
- encrypting said data at said terminal under said transfer key to obtain first encrypted data,
- transmitting a message including at least said first encrypted data from said terminal to said data processing system,
- providing a first host parameter at said data processing system representing said transfer key encrypted under a first system master key of said data processing system,
- providing a second host parameter at said data processing system representing a first authentication key encrypted under a second system master key of said data processing system, with said first and second system master keys being different from each other,
- performing a translate operation at said data processing system in accordance with said first and second host parameters to translate said data from encryption under said transfer key to encryption under said first authentication key, said re-encrypted data representing a first authentication parameter,
- providing an authentication parameter of reference at said data processing system, and
- comparing said first authentication parameter with said authentication parameter of reference at said data processing system to provide an indication representing a verification of said received data.

10. In the process as defined in claim 9, wherein said translate operation performed at said data processing system includes the steps of:
- providing said first system master key of said data processing system,
- decrypting said first host parameter under control of said first system master key to obtain said transfer key,
- decrypting said encrypted data under control of said transfer key to obtain said data,
- providing said second system master key of said data processing means,
- decrypting said second host parameter under control of said second system master key to obtain said first authentication key, and
- encrypting said data under control of said first authentication key to obtain said first authentication parameter.

11. In a system providing data communication between a terminal at which data is entered and a plurality of data processing systems, each having cryptographic apparatus and said terminal being provided with a first transfer key, a process for verifying at one of the plurality of data processing systems, the data entered at said terminal comprising the steps of:
- encrypting said data at said terminal under said first transfer key to obtain first encrypted data,
- transmitting a message including at least said first encrypted data from said terminal to a first one of said plurality of data processing systems,
- providing a first host parameter at said first data processing system representing said first transfer key encrypted under a first system master key of said first data processing system,
- providing a second host parameter at said first data processing system representing a first authentication key encrypted under a second system master key of said first data processing system, with said first and second system master keys being different from each other,
- performing a first translate operation at said first data processing system in accordance with said first and second host parameters to translate said data from encryption under said first transfer key to encryption under said first authentication key, said re-encrypted personal identification number representing a first authentication parameter,
- providing an authentication parameter of reference at said first data processing system, and comparing said first authentication parameter with said authentication parameter of reference at said first data processing system to provide an indication representing a verification of the received data.

12. In the process as defined in claim 11, further including the steps of:
providing a third host parameter at said first data processing system representing a second transfer key encrypted under said second system master key of said first data processing system,
performing a second translate operation at said first data processing system in accordance with said first and third host parameters to translate said data from encryption under said first transfer key to encryption under said second transfer key, said re-encrypted data representing second encrypted data,
transmitting a message including at least said second encrypted data from said first data processing system to a second one of said plurality of data processing systems to determine whether the data can be verified at said second data processing system.

13. In a system providing data communication between a first and second data processing system, each having cryptographic apparatus and said first data processing system being provided with a transfer key, a process for verifying data transmitted between said data processing systems comprising the steps of:
encrypting said data at said first data processing system under said transfer key to obtain first encrypted data,
transmitting a message including at least said first encrypted data from said first data processing system to said second data processing system,
providing a first host parameter at said second data processing system representing said transfer key encrypted under a first system master key of said second data processing system,
providing a second host parameter at said second data processing system representing a first authentication key encrypted under a second system master key, with said first and second system master keys being different from each other,
performing a translate operation at said data processing system in accordance with said first and second host parameters to translate said data from encryption under said transfer key to encryption under said first authentication key, said re-encrypted data representing a first authentication parameter,
providing an authentication parameter of reference at said second data processing system, and
comparing said first authentication parameter with said authentication parameter of reference at said second data processing system to provide an indication representing a verification of the received data.

14. In the process as defined in claim 13 wherein said translate operation performed at said second data processing system includes the steps of:
providing said first system master key of said second data processing system,
decrypting said first host parameter under control of said first system master key to obtain said transfer key,
decrypting said encrypted data under control of said transfer key to obtain said data,
providing said second system master key of said second data processing means.
decrypting said second host parameter under control of said second system master key to obtain said first authentication key, and
encrypting said data under control of said first authentication key to obtain said first authentication parameter.

15. In a system providing data communication between a first data processing system and a plurality of other data processing systems, each having cryptographic apparatus and said first data processing system being provided with a first transfer key, a process for verifying data transmitted between said data processing systems comprising the steps of:
encrypting said data at said first data processing system under said first transfer key to obtain first encrypted data,
transmitting a message including at least said first encrypted data from said first data processing system to a second one of said plurality of data processing systems,
providing a first host parameter at said second data processing system representing said first transfer key encrypted under a first system master key of said second data processing system,
providing a second host parameter at said second data processing system representing a first authentication key encrypted under a second system master key of said second data processing system, with said first and second system master keys being different from each other,
performing a first translate operation at said second data processing system in accordance with said first and second host parameters to translate said data from encryption under said first transfer key to encryption under said first authentication key, said re-encrypted data representing a first authentication parameter,
providing an authentication parameter of reference at said second data processing system, and
comparing said first authentication parameter with said authentication parameter of reference at said second data processing system to provide an indication representing a verification of the received data.

16. In the process as defined in claim 15, further including the steps of:
providing a third host parameter at said second data processing system representing a second transfer key encrypted under said second system master key of said second data processing system,
performing a second translate operation at said second data processing system in accordance with said first and third host parameters to translate said data from encryption under said first transfer key to encryption under said second transfer key, said re-encrypted data representing second encrypted data,
transmitting a message including at least said second encrypted data from said second data processing system to a third one of said plurality of data processing systems to determine whether the data can be verified at said third data processing system.

17. A process for performing a data translate operation in a secure manner using cryptographic apparatus comprising the steps of:

providing first encrypted data representing data encrypted under a first key, providing a first parameter representing said first key encrypted under a first master key, providing a second parameter representing a second key encrypted under a second master key, with said first and second master keys being different from each other, and performing a translate operation in accordance with said first and second parameters to translate said data from encryption under said first key to encryption under said second key to obtain second encrypted data.

18. In the process as defined in claim 17 wherein said translate operation includes the steps of:

providing said first master key, decrypting said first parameter under control of said first master key to obtain said first key, decrypting said first encrypted data under control of said first key to obtain said data, providing said second master key, decrypting said second parameter under control of said second master key to obtain said second key, and encrypting said data under control of said second key to obtain said second encrypted data.

19. A process for verifying data received at a data processing system using cryptographic apparatus comprising the steps of:

receiving said data at said data processing system encrypted under a first key, providing a first host parameter at said data processing system representing said first key encrypted under a first system master key of said data processing system, providing a second host parameter at said data processing system representing a first authentication key encrypted under a second system master key, with said first and second system master keys being different from each other, performing a first operation at said data processing system in accordance with said first and second host parameters to translate said data from encryption under said authentication key, said re-encrypted data representing a first authentication parameter, providing an authentication parameter of reference at said data processing system, and comparing said first authentication parameter with said authentication parameter of reference at said data processing system to provide an indication representing a verification of said received data.

20. In the process as defined in claim 19 wherein said first operation performed at said data processing system includes the steps of:

providing said first system master key of said first data processing system, decrypting said first host parameter under control of said first system master key to obtain said first key, decrypting said encrypted data under control of said first key to obtain said data, providing said second system master key of said first data processing means, decrypting said second host parameter under control of said second system master key to obtain said first authentication key, and encrypting said data control of said first authentication key to obtain first authentication parameter.

21. In the process as defined in claims 1, 5, 9, 11, 13, 15, 17 or 19 wherein said first and second system master keys are variants of a single system master key.

22. In the process as defined in claims 1, 5, 9, 11, 13, 15, 17 or 19 wherein said data comprises a personal identification number.

23. In the process as defined in claims 1, 5, 9, 11, 13, 15, 17, or 19 wherein said data comprises a cryptographic key.

24. In a system providing data communication between a terminal and one of a plurality of data processing systems, each having cryptographic apparatus and said terminal being provided with a first transfer key, a process for verifying the identity of a terminal user provided with a secret personal identification number comprising the steps of:

encrypting said personal identification number at said terminal under said first transfer key to obtain a first encrypted personal identification number, transmitting a message including at least said first encrypted personal identification number from said terminal to a first one of said plurality of data processing systems, providing a first host parameter at said first data processing system representing said first transfer key encrypted under a first system master key of said first data processing system, providing a second host parameter at said first data processing system representing a first authentication key encrypted under a second system master key of said first data processing system, with said first and second master keys being different from each other, performing a first operation at said first data processing system in accordance with said first and second host parameters to translate said personal identification number from encryption under said first transfer key to encryption under said first authentication key, said re-encrypted personal identification number representing a first authentication parameter, providing an authentication parameter of reference at said first data processing system, and comparing said first authentication parameter with said authentication parameter of reference at said first data processing system to provide an indication representing a verification of the identity of the terminal user.

25. In the process as defined in claim 24, further including the steps of:

providing a third host parameter at said first data processing system representing a second transfer key of said first data processing system, performing a second operation at said first data processing system in accordance with said first and third host parameters to translate said personal identification number from encryption under said first transfer key to encryption under said second transfer key, said re-encrypted personal identification number representing a second encrypted personal identification number, transmitting a message including at least said second encrypted personal identification number from said first data processing system to a second one of said plurality of data processing systems to determine whether the identity of the terminal user can be verified at said second data processing system.

* * * * *